(12) United States Patent
Hasegawa et al.

(10) Patent No.: US 9,564,655 B2
(45) Date of Patent: Feb. 7, 2017

(54) MANUFACTURING METHOD OF ALL-SOLID BATTERY

(71) Applicant: TOYOTA JIDOSHA KABUSHIKI KAISHA, Toyota-shi, Aichi-ken (JP)

(72) Inventors: Hajime Hasegawa, Susono (JP); Norihiro Ose, Sunto-gun (JP); Tomoharu Sasaoka, Hadano (JP); Kazuhito Kato, Sunto-gun (JP); Kengo Haga, Susono (JP); Daichi Kosaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 14/557,711

(22) Filed: Dec. 2, 2014

(65) Prior Publication Data

US 2015/0180076 A1    Jun. 25, 2015

(30) Foreign Application Priority Data

Dec. 19, 2013 (JP) ................ 2013-262797

(51) Int. Cl.
*G01R 31/28* (2006.01)
*H01M 10/04* (2006.01)
(Continued)

(52) U.S. Cl.
CPC ....... *H01M 10/0468* (2013.01); *H01M 10/052* (2013.01); *H01M 10/0562* (2013.01);
(Continued)

(58) Field of Classification Search
CPC .................... Y02E 60/122; H01M 2010/4271;
H01M 6/50; Y02P 70/54; Y10T 428/31;
Y10T 29/49004; Y10T 29/49108; G01R 19/16542; G01R 31/3679
(Continued)

(56) References Cited

U.S. PATENT DOCUMENTS

| 7,951,482 B2* | 5/2011 | Ichinose | H01M 2/0207 429/144 |
| 2005/0079407 A1* | 4/2005 | Higashino | H01M 2/1061 429/66 |

(Continued)

FOREIGN PATENT DOCUMENTS

| CN | 102326288 A | 1/2012 |
| CN | 102340022 A | 2/2012 |

(Continued)

*Primary Examiner* — Thiem Phan
(74) *Attorney, Agent, or Firm* — Oliff PLC

(57) ABSTRACT

A manufacturing method of an all-solid battery includes fabricating a single battery including a positive electrode layer, a negative electrode layer, and a solid electrolyte layer arranged between the positive electrode layer and the negative electrode layer; fabricating a plurality of battery packs including the plurality of single batteries; confining a plurality of battery packs by an equal confining pressure; measuring the electrical characteristics of the plurality of confined battery packs; determining the battery pack whose measured electrical characteristics are the worst of the plurality of battery packs; reducing the confining pressures of the other battery packs so that the electrical characteristics of the other battery packs are equal to that of the battery pack whose electrical characteristics have been determined to be the worst; and electrically connecting in parallel the battery packs.

8 Claims, 14 Drawing Sheets

(51) Int. Cl.
   *H01M 10/052* (2010.01)
   *H01M 10/0562* (2010.01)
   *H01M 10/0585* (2010.01)
   *H01M 10/48* (2006.01)

(52) U.S. Cl.
   CPC ....... *H01M 10/0585* (2013.01); *H01M 10/48* (2013.01); *Y02E 60/122* (2013.01); *Y02P 70/54* (2015.11); *Y02T 10/7011* (2013.01); *Y10T 29/49004* (2015.01); *Y10T 29/49108* (2015.01)

(58) Field of Classification Search
   USPC ............... 29/593, 428, 452, 623.1, 623.2, 623.4,29/623.5; 429/66, 71, 99, 100, 120, 144, 152, 429/159, 162, 251, 254
   See application file for complete search history.

(56) References Cited

U.S. PATENT DOCUMENTS

2010/0190049 A1  7/2010  Kawase et al.
2011/0287292 A1  11/2011  Suyama et al.

FOREIGN PATENT DOCUMENTS

| JP | A-2008-288168 | 11/2008 |
| JP | A-2009-26703 | 2/2009 |
| JP | A-2010-205479 | 9/2010 |
| JP | A-2012-138192 | 7/2012 |
| JP | A-2013-45555 | 3/2013 |

\* cited by examiner

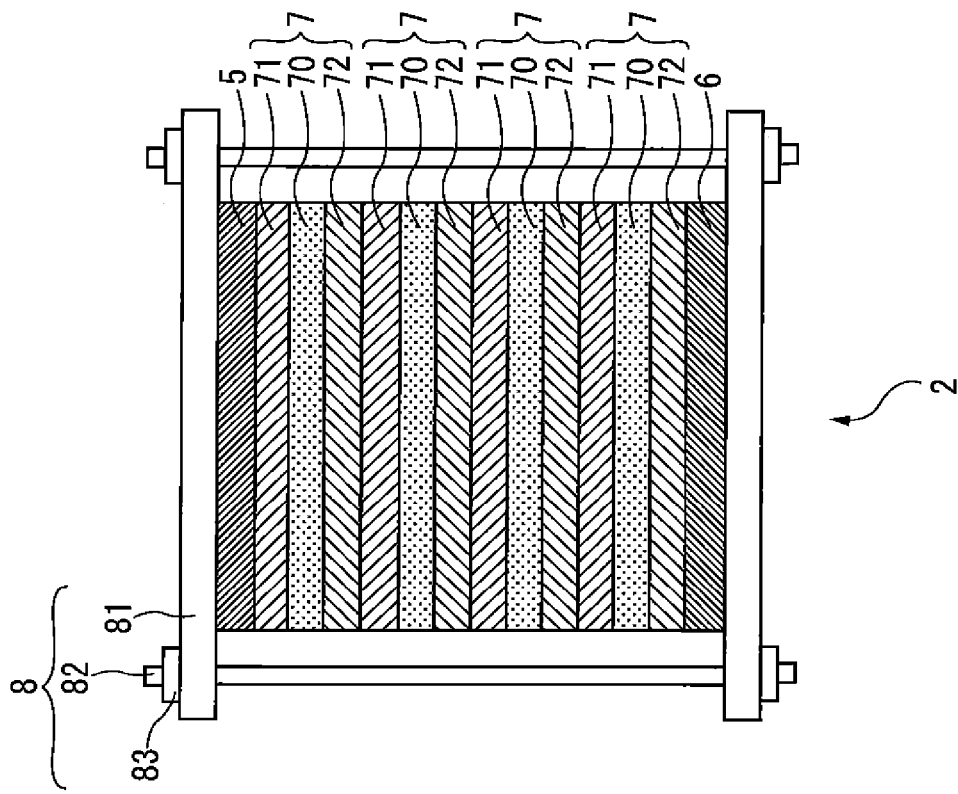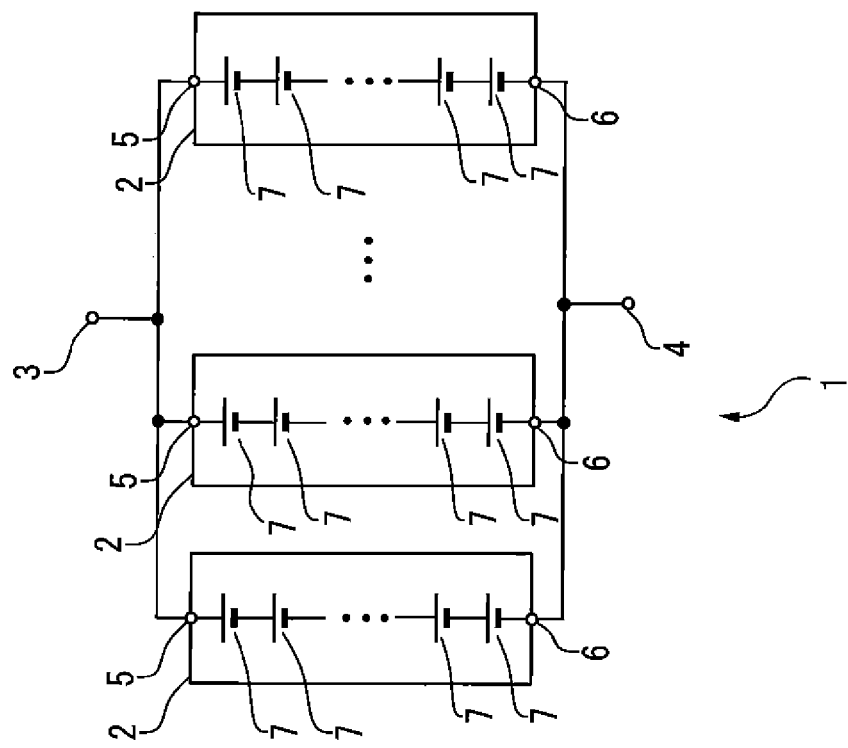

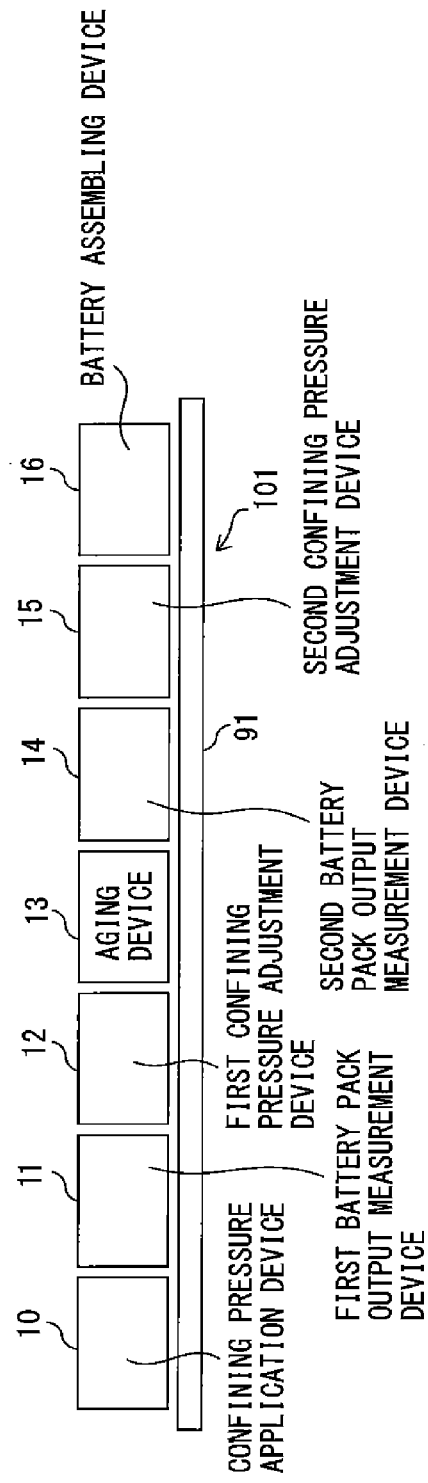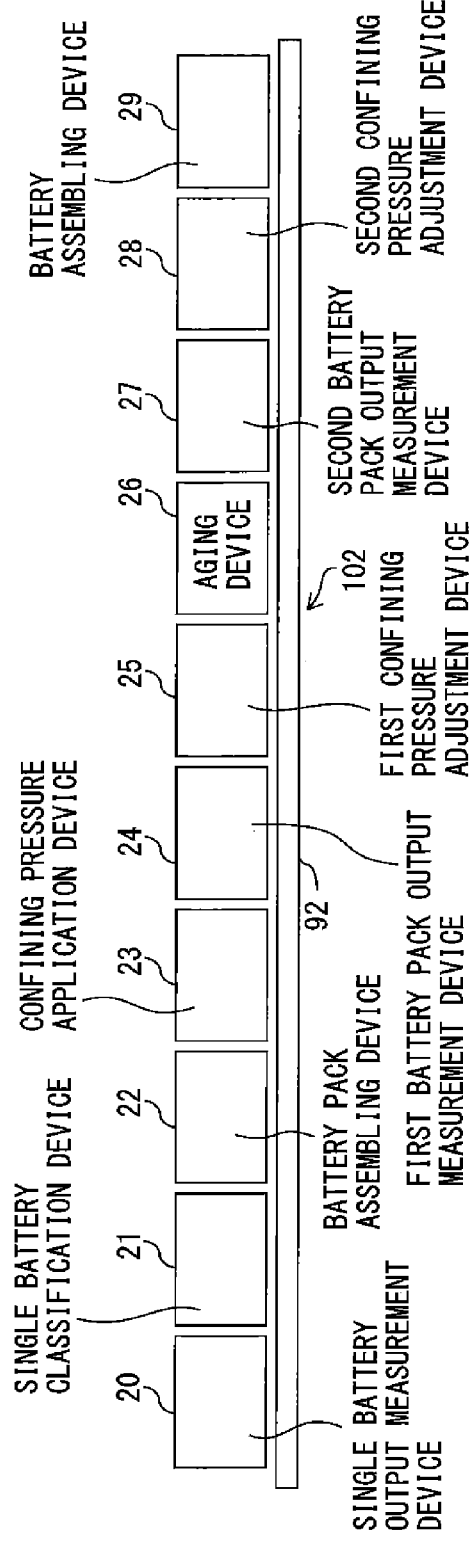

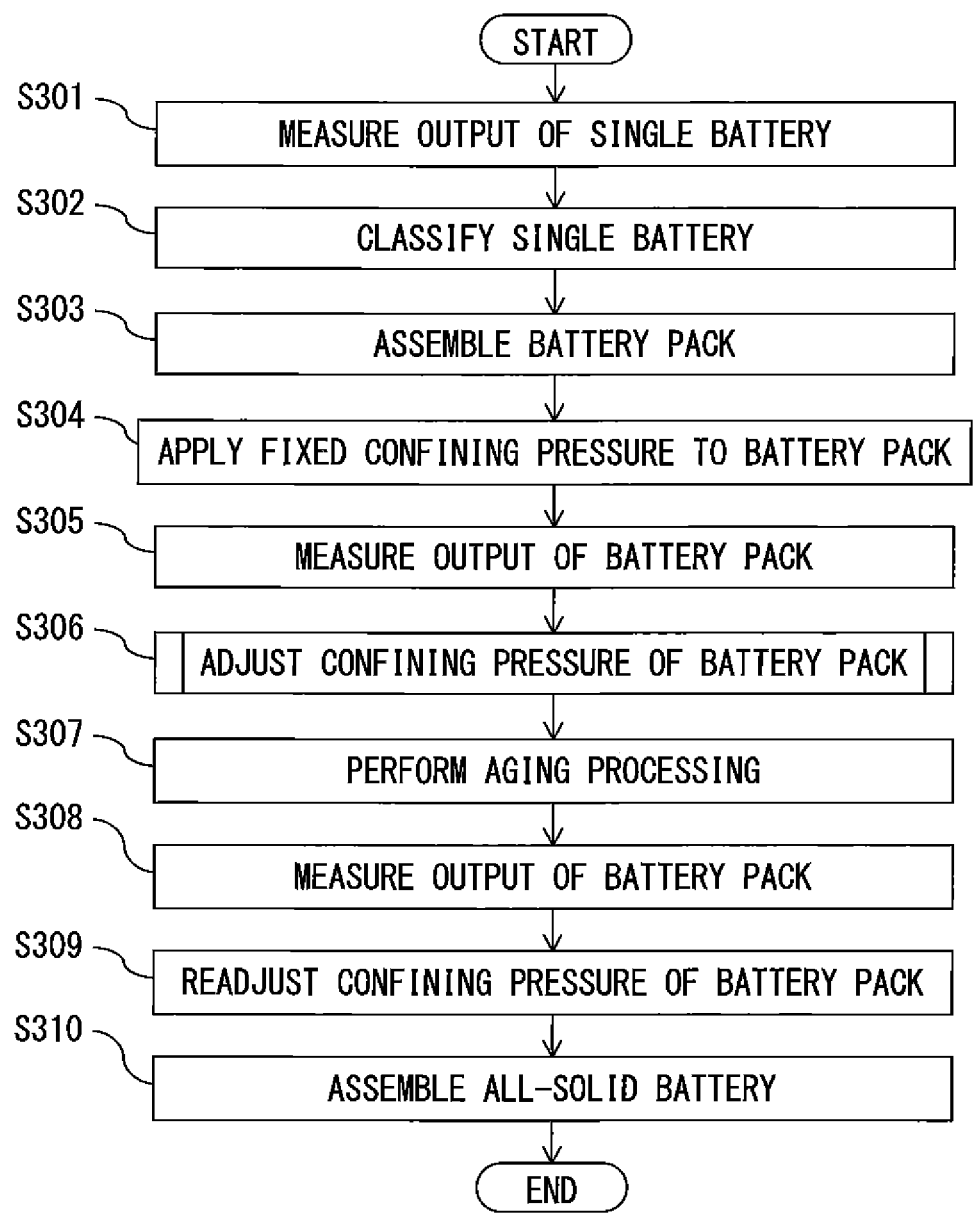

MANUFACTURING METHOD OF ALL-SOLID BATTERY

CROSS-REFERENCE TO RELATED APPLICATION

This application is based upon and claims the benefit of priority of the prior Japanese Patent Application No.2013-262797, filed on Dec. 19, 2014, the entire contents of which are incorporated herein by reference.

FIELD

The present invention relates to a manufacturing method of an all-solid battery.

BACKGROUND

A lithium ion secondary battery has a capacity density higher than that of the other secondary batteries and is capable of an operation at high voltages, and therefore is used as a power source of information-related equipment, communication equipment, etc., as a secondary battery that can be reduced in size and weight. Further, the development of a lithium ion secondary battery used as a power source of a low-pollution car, such as an electric car and a hybrid car, is progressing.

A lithium ion secondary battery or the lithium secondary battery includes a positive electrode layer and a negative electrode layer, and an electrolyte arranged between the positive electrode layer and the negative electrode layer and including lithium salt. The electrolyte of the lithium ion secondary battery or the lithium secondary battery is formed by a non-aqueous liquid or solid. when a non-aqueous liquid electrolyte is used as an electrolyte, an interface between the positive electrode active material constituting the positive electrode layer and the electrolyte is easily formed, and therefore it is easy to improve the electrical performance, such as an output and an internal resistance, since an electrolyte solution permeates into the inside of the positive electrode layer. The liquid used as an electrolyte solution in the lithium ion secondary battery is generally combustible, and therefore safety is guaranteed by mounting equipment that prevents a short circuit and a device that suppresses a rise in temperature of the battery. On the other hand, in the all-solid battery the whole of which has been made solid by using a solid electrolyte in place of the liquid electrolyte is thought to be excellent in the manufacturing cost and the productivity, since no combustible material is arranged inside the battery, and therefore the safety device can be simplified.

It is known that in an all-solid battery including a fuel cell stack in which a plurality of single batteries is stacked, the electrical characteristics of the all-solid battery are changed by changing a confining pressure that is applied to the stack direction of the fuel cell stack. For example, it is known that one of the confining pressures of the fuel cell stack and the electrical characteristics of the fuel cell stack is detected by changing the confining pressure applied in the stack direction of the fuel cell stack and the confining pressure is controlled based on the detected confining pressure or electrical characteristics.

RELATED DOCUMENTS

[Patent Literature 1] Japanese Unexamined Patent Publication (Kokai) No. 2008-288168

[Patent Literature 2] Japanese Unexamined Patent Publication (Kokai) No. 2010-205479

SUMMARY

However, when an all-solid battery is formed by combining a plurality of battery packs, the performance of the all-solid battery may be reduced since the electrical characteristics between the battery packs which form the all-solid battery is different from each other. Further, the outputs of the battery packs can also be substantially equal each other by controlling the confining pressure of each battery pack. However, when the criterion for the output is too high, some battery packs may not fulfill the criterion even if the confining pressure is changed.

Thus, an object of the present invention is to provide a manufacturing method of an all-solid battery that suppresses the performance of the all-solid battery from reducing when the electrical characteristics of all the battery packs are substantially equal each other.

The manufacturing method of an all-solid battery according to the present invention includes: fabricating a single battery including a positive electrode layer, a negative electrode layer, and a solid electrolyte layer arranged between the positive electrode layer and the negative electrode layer; fabricating a plurality of battery packs including a plurality of single batteries; confining a plurality of battery packs by an equal confining pressure; measuring the electrical characteristics of the plurality of confined battery packs; determining the battery pack whose measured electrical characteristics are the worst of the plurality of battery packs; reducing the confining pressures of the other battery packs so that the electrical characteristics of the other battery packs become equal to the electrical characteristics of the battery pack whose electrical characteristics have been determined to be the worst; and electrically connecting in parallel the other battery packs whose confining pressure has been reduced and the battery pack whose electrical characteristics have been determined to be the worst.

According to the present invention, it is possible to provide a manufacturing method of an all-solid battery that suppresses the performance of the all-solid battery from reducing when the electrical characteristics of all the battery packs are substantially equal each other.

BRIEF DESCRIPTION OF THE DRAWINGS

FIG. 1A is a circuit block diagram of an all-solid battery according to an embodiment;

FIG. 1B is a schematic section diagram of a battery pack included in the all-solid battery illustrated in FIG. 1A;

FIG. 3A is a schematic block diagram of an all-solid battery manufacturing device according to a first embodiment;

FIG. 3B is a schematic block diagram of an all-solid battery manufacturing device according to a second embodiment;

FIG. 9A is a flowchart illustrating a processing flow of the all-solid battery manufacturing device illustrated in FIG. 3C;

DESCRIPTION OF EMBODIMENTS

Figure 2:
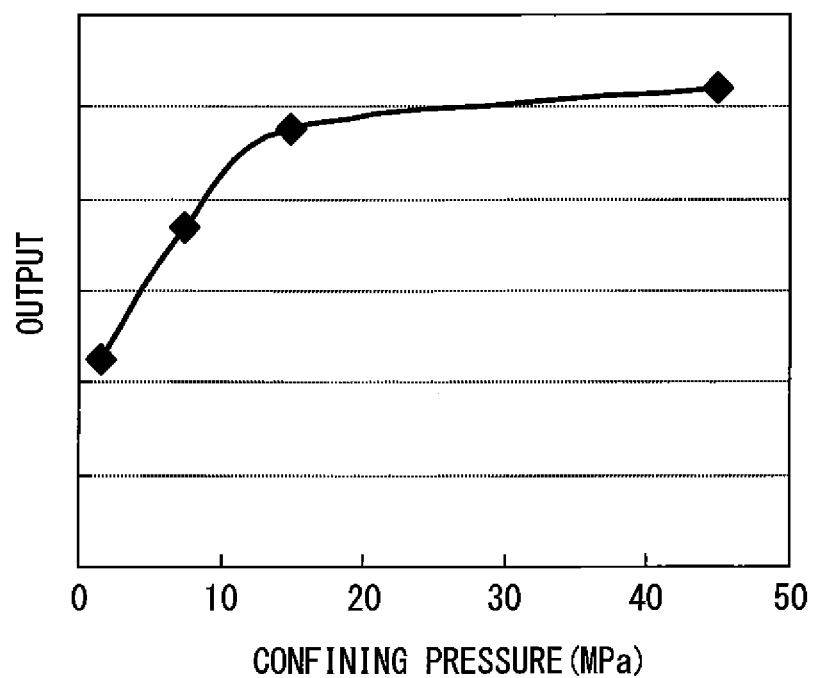
FIG. 2 is a diagram illustrating a relationship between the confining pressure of a confining jig and the output of the all-solid battery.

Hereinafter, with reference to the drawings, a manufacturing method of an all-solid battery according to the present invention is explained. However, it should be noted that the technical scope of the present invention is not limited to embodiments below but encompasses the inventions and equivalents thereof described in the claims.

Before explaining a manufacturing method of an all-solid battery according to an embodiment, an all-solid battery according to an embodiment is explained.

FIG. 1A is a circuit block diagram of an all-solid battery according to an embodiment and FIG. 1B is a schematic section diagram of an example of a battery pack included in the all-solid battery illustrated in FIG. 1A.

An all-solid battery 1 includes a plurality of battery packs 2 connected in parallel, a positive electrode 3, and a negative electrode 4. Positive electrode collectors 5 of the plurality of battery packs 2 are connected to one another and are connected to the positive electrode 3 and negative electrode collectors 6 of the plurality of battery packs 2 are connected to one another and are connected to the negative electrode 4.

Each of the plurality of battery packs 2 includes the positive electrode collector 5, the negative electrode collector 6, a plurality of single batteries 7 connected in series by being stacked between the positive electrode collector 5 and the negative electrode collector 6, and a confining jig 8. In FIG. 1B, the battery pack 2 includes the four single batteries 7, but as the number of single batteries included in the battery pack 2, an appropriate value may be selected. The positive electrode collector 5 and the negative electrode collector 6 extend to the outside of the battery pack 2 and it is possible to take out electric energy produced by the battery reaction to the outside the battery pack 2 via an electrode terminal. The positive electrode collector 5 is formed by SUS, Ni, Cr, Au, Pt, Al, Fe, Ti, Zn, etc. The negative electrode collector 6 is formed of SUS, Cu, Ni, Fe, Ti, Co, Zn, etc.

Each of the single batteries 7 includes a solid electrolyte layer 70, a positive electrode active material layer 71 arranged on one surface of the solid electrolyte layer 70, and a negative electrode active material layer 72 arranged on the other surface of the solid electrolyte layer 70.

As the solid electrolyte material included in the solid electrolyte layer 70, it is possible to use a material that can be used as the solid electrolyte of the all-solid battery. For example, it is possible to use a sulfide-based amorphous solid electrolyte, such as $Li_2S$ -$P_2S_5$, an oxide-based amorphous solid electrolyte, a crystalline oxide, a crystalline oxynitride, or LiI, LiI-$Al_2O_3$, $Li_3N$, or $Li_3N$-LiI-LiOH, etc. The sulfide-based amorphous solid electrolyte is used preferably, since it has excellent lithium ion conductivity. Further, as the solid electrolyte of the present invention, it is possible to use a polyethylene oxide including lithium salt, a polypropylene oxide, a polyvinylidene fluoride, or semi-solid polymer electrolyte, such as polyacrylonitrile.

As the active material included in the positive electrode active material layer 71 and the negative electrode active material layer 72, it is possible to use a material that can be used as the electrode active material of the all-solid battery. Examples of the active material are lithium cobalt oxide ($LiCoO_2$), lithium nickel oxide ($LiNiO_2$), lithium manganese oxide ($LiMn_2O_4$) different kind element substituent Li-Mn spinel having a composition expressed as $LiCo_{1/3}Ni_{1/3}Mn_{1/3}O_2$, $Li_{1+x}Mn_{2-x-y}M_yO_4$ (M is one or more kinds of metal elements selected from Al, Mg, Co, Fe, Ni, and Zn), titanium sulfide ($TiS_2$), carbon material, such as graphite and hard carbon, lithium metal (Li), lithium alloy (LiM, M is Sn, Si, Al, Ge, Sb, or P), lithium storable intermetallic compound ($Mg_xM$, or NySb, M is Sn, Ge, or Sb, and N is In, Cu, or Mn), etc., or their derivatives.

In the present embodiment, there is no clear distinction between the positive electrode active material and the negative electrode active material, and it is possible to constitute a battery having any voltage by comparing the charge/discharge potentials of the two kinds of material and to use one kind of material whose charge/discharge potentials exhibit noble potentials as a positive electrode and the other kind of material whose charge/discharge potentials exhibit less noble potentials as a negative electrode.

The positive electrode active material layer 71 may include the publicly-known solid electrolyte that can be used in the all-solid battery. An example of the solid electrolyte that is included in the positive electrode active material layer 71 is the above-described solid electrolyte that can be contained in the solid electrolyte layer. When the solid electrolyte is contained in the positive electrode active material layer 71, as the mixture ratio of the positive electrode active material and the solid electrolyte, preferably, the volume ratio of the positive electrode active material and the solid electrolyte is 20:80 to 90:10, and more preferably, 40:60 to 70:30.

When the sulfide solid electrolyte is contained in the positive electrode active material layer 71, preferably the positive electrode active material is covered with an ion conductive oxide from the viewpoint of achieving an aspect in which an increase in the battery resistance can be prevented easily by making it hard for a high resistance layer to be formed at the interface between the positive electrode active material and the sulfide solid electrolyte. An example of the lithium ion conductive oxide used to cover the positive electrode active material is an oxide expressed by a general chemical formula $Li_xAO_y$ (A is B, C, Al, Si, P, S, Ti, Zr, Nb, Mo, Ta, or W, and x and y are positive numbers). Specifically, $Li_3PO_4$, $Li_2SO_4$, $Li_2TiO_3$, $LiNbO_3$, are included in the lithium ion conductive oxide. The lithium ion conductive oxide may be a composite oxide.

When the surface of the positive electrode active material is covered with the ion conductive oxide, at least part of the positive electrode active material may be covered with the ion conductive oxide or the entire surface of the positive electrode active material may be covered. Preferably, the thickness of the ion conductive oxide with which the positive electrode active material is covered is, for example, not less than 0.1 nm and not more than 100 nm, and more preferably, not less than 1 nm and not more than 20 nm. It is possible to measure the thickness of the ion conductive oxide by using, for example, a transmission electron microscope (TEM) etc.

Each of the solid electrolyte layer 70, the positive electrode active material 71, and the negative electrode active layer 72 may include a binder. As the material of the binder, butyl rubber, hydrogenated butylene rubber, polystyrene, styrene butadiene rubber, polyvinyl fluoride, polyvinylidene fluoride, fluororubber, etc., are desirable, but not limited in particular.

Each of the positive electrode active material 71 and the negative electrode active material 72 may include electrically conductive assistant particles. The electrically conductive assistant particle is not limited in particular and it is possible to use black lead, carbon black, etc.

The confining jig 8 includes a pair of support plates 81, a connecting rod 82 penetrating through through-holes formed in the pair of the support plates 81, and a bolt 83 that fixes the position of the support plate 81. When the bolt 83 is tightened, the distance between the pair of the support plates 81 reduces and the confining pressure of each single battery 7 is high. When the bolt 83 is loosened, the distance between the pair of the support plates 81 increases and the confining pressure of each single battery 7 is low.

FIG. 2 is a diagram illustrating the relationship between the confining pressure of the confining jig 8 and the output of the all-solid battery 1. In FIG. 2, the horizontal axis represents the confining pressure of the confining jig 8 and the vertical axis represents the output of the all-solid battery 1.

Preferably, the confining pressure of the confining jig 8 is 20 MPa or less and more preferably, the confining pressure is 15 MPa or less. The reason is that when the confining pressure is lower than 15 MPa, the output of the all-solid battery 1 increases in proportion to the confining pressure of the confining jig 8 and when the confining pressure of the confining jig 8 exceeds 20 MPa, the output of the all-solid battery 1 almost saturates. If the confining pressure of the confining jig 8 is increased too high, various problems may occur. Firstly, the electrical characteristics, such as the output, may degrade, since the pressure escapes due to the creep of the material and member forming the all-solid battery 1. Further, the all-solid battery 1 may fail when the positive electrode active material layer 71 and solid electrolyte layer 70 of the single battery 7 short-circuit. In order to apply a high confining pressure, a thick plate material having a high rigidity is used as the support plate 81 of the confining jig 8 so that the confining pressure is uniformly apply on the entire surface of the single battery 7 even if the confining pressure is increased. If the plate material having a high rigidity is used as the support plate 81, the confining jig 8 increases in size and also in weight, and therefore the fuel efficiency of a vehicle that mounts the all-solid battery 1 may be reduced. As described above, if the confining pressure of the confining jig 8 is increased too much, various problems may occur, and therefore preferably, the confining pressure of the confining jig 8 is set so that the output of the all-solid battery 1 becomes a desired magnitude.

Further, even if the confining pressure of the confining jig 8 is uniform, the outputs of the battery packs 2 may be different, since the electrical characteristics of the single battery 7 and the battery pack 2 based on the manufacturing conditions are different. When the all-solid battery 1 is formed by the battery packs 2 whose outputs are different, the performance of the all-solid battery 1 may be deteriorate and the life thereof may be reduced, since any of the battery packs 2 is over-discharged or overcharged. Further, the outputs of the battery packs 2 may be substantially equal each other by controlling the confining pressure of each battery pack. However, when the criterion for the output used is too high, a battery may not fulfill the criterion even if the confining pressure is changed. Thus, an object of a manufacturing method of an all-solid battery according to an embodiment is to manufacture an all-solid battery that is formed by battery packs having uniform electrical characteristics.

Figure 3C:
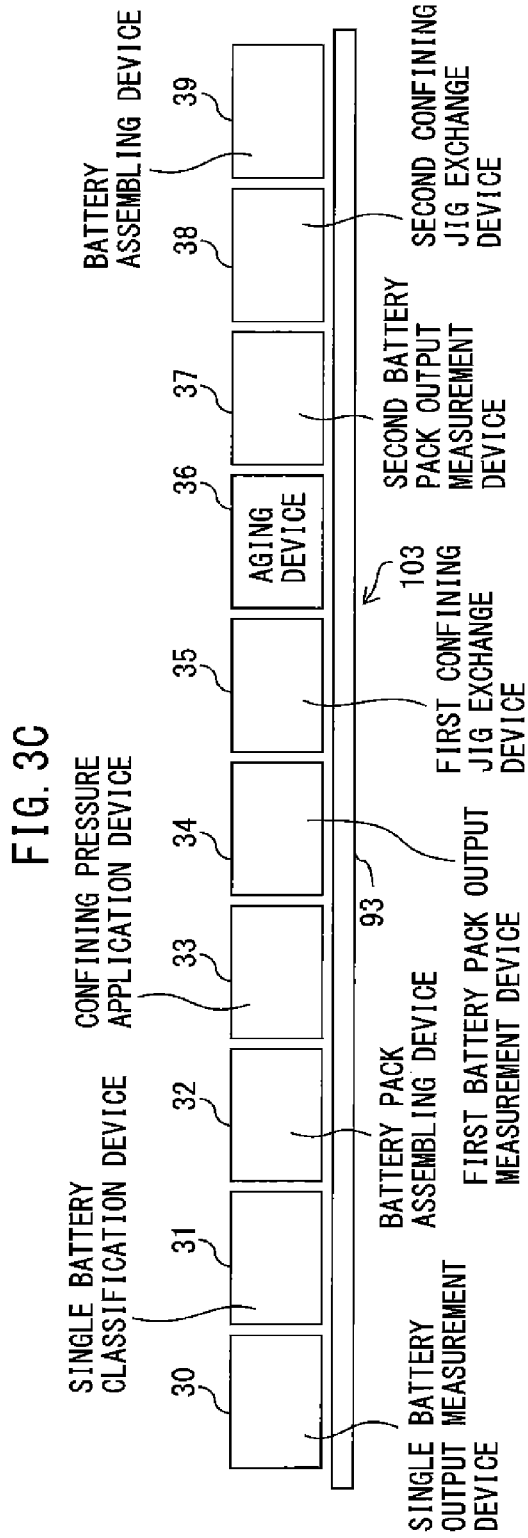
FIG. 3C is a schematic block diagram of an all-solid battery manufacturing device according to a third embodiment.
Figure 3D:
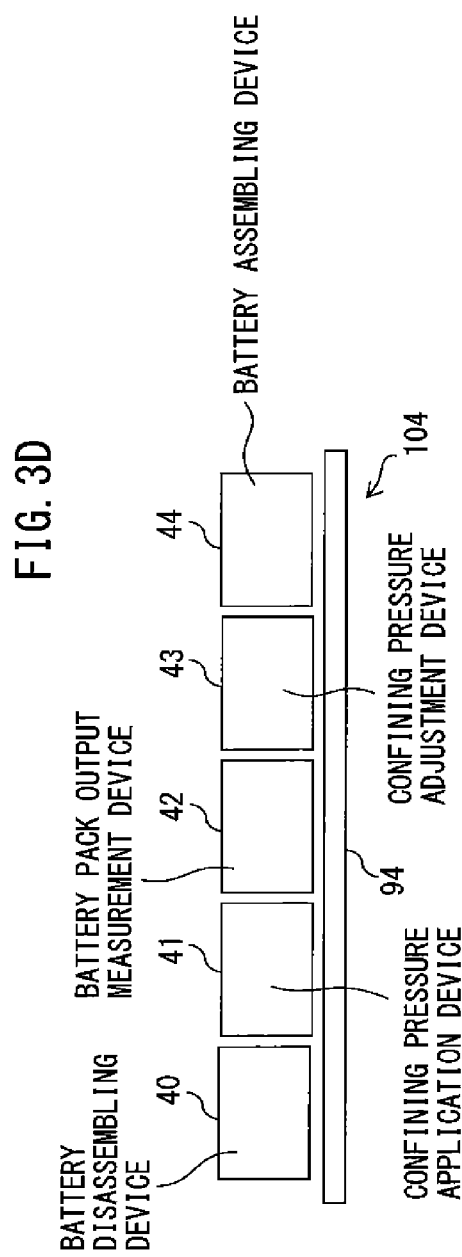
FIG. 3D is a schematic block diagram of an all-solid battery manufacturing device according to a fourth embodiment.

FIG. 3A is a schematic block diagram of an all-solid battery manufacturing device according to a first embodiment and FIG. 3B is a schematic block diagram of an all-solid battery manufacturing device according to a second embodiment. FIG. 3C is a schematic block diagram of an all-solid battery manufacturing device according to a third embodiment and FIG. 3D is a schematic block diagram of an all-solid battery manufacturing device according to a fourth embodiment.

First, the all-solid battery manufacturing device according to the first embodiment illustrated in FIG. 3A is explained.

An all-solid battery manufacturing device 101 according to the first embodiment includes a confining pressure application device 10, a first battery pack output measurement device 11, a first confining pressure adjustment device 12, and an aging device 13. The all-solid battery manufacturing device 101 further includes a second battery pack output measurement device 14, a second confining pressure adjustment device 15, a battery assembling device 16, and a conveyance device 91.

Figure 4B:
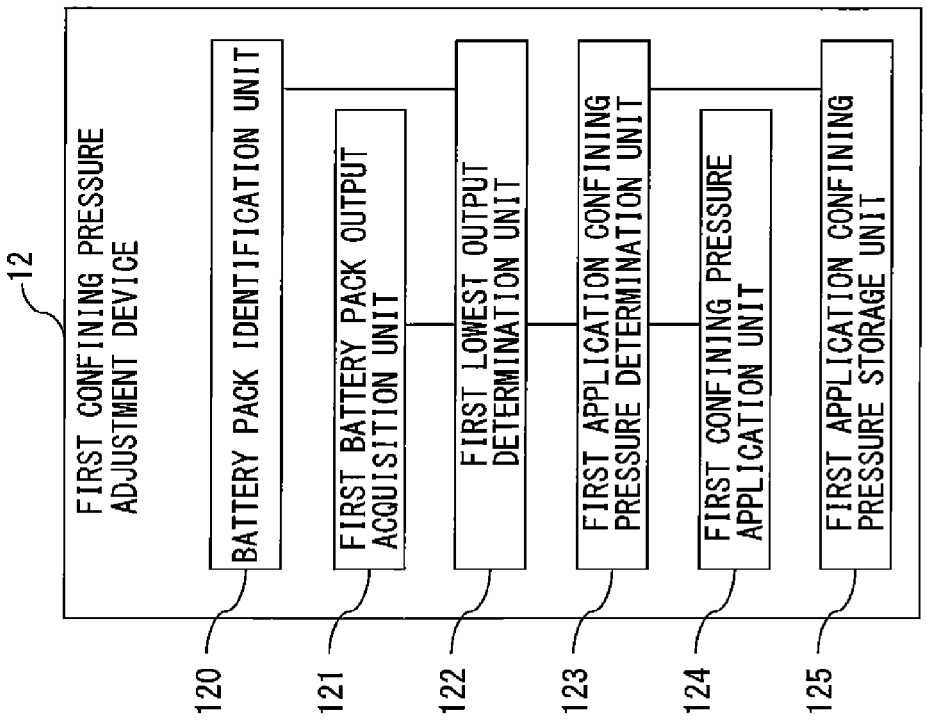
FIG. 4B is a function block diagram of a first confining pressure adjustment device illustrated in FIG. 3A.
Figure 4A:
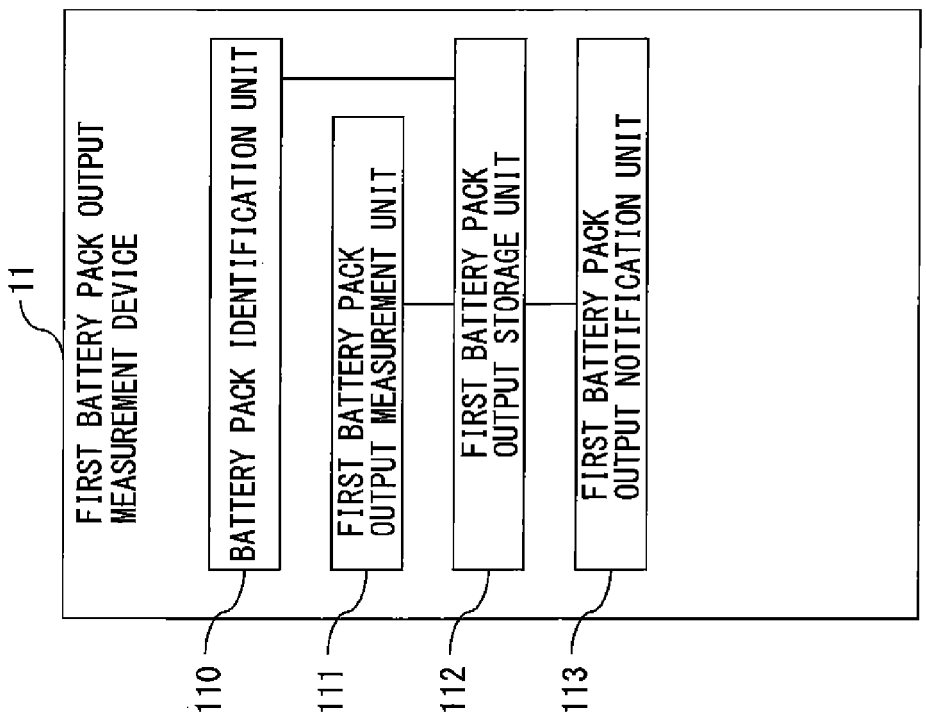
FIG. 4A is a function block diagram of a first battery pack output measurement device illustrated in FIG. 3A.
Figure 4D:
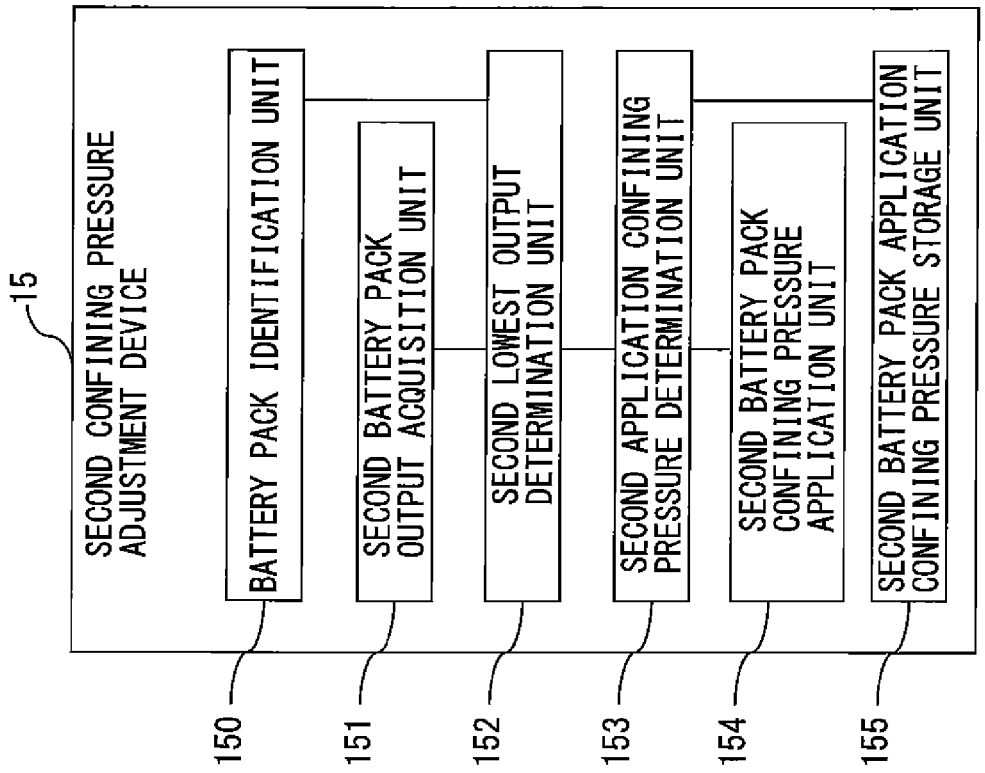
FIG. 4D is a function block diagram of a second confining pressure adjustment device illustrated in FIG. 3A.
Figure 4C:
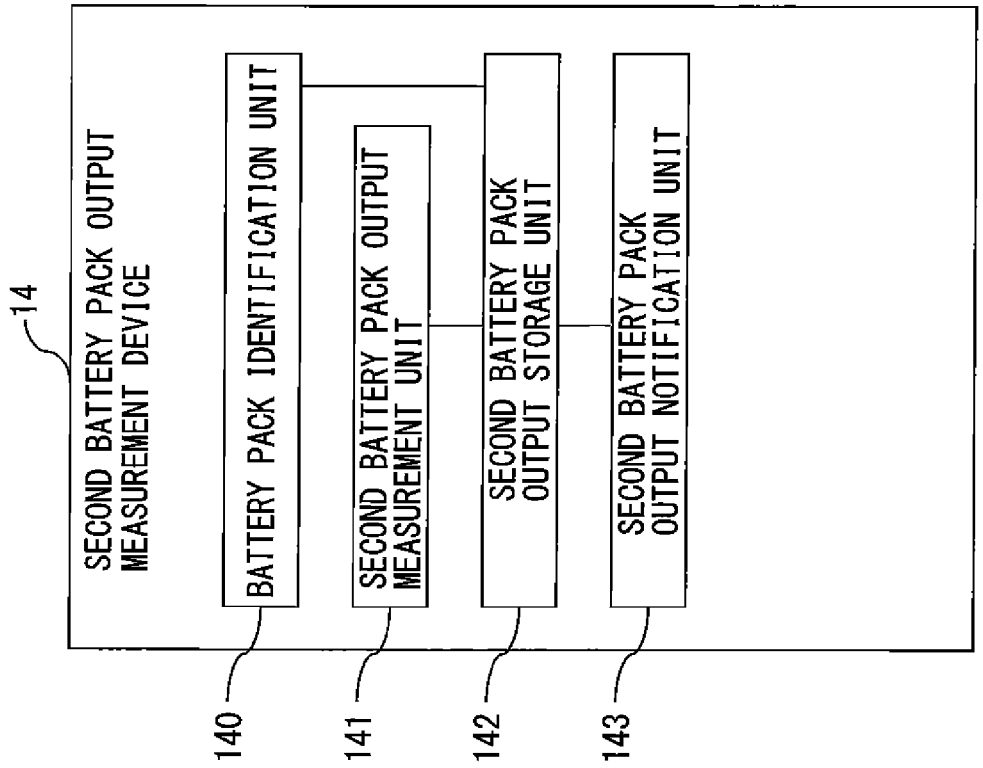
FIG. 4C is a function block diagram of a second battery pack output measurement device illustrated in FIG. 3A.

FIG. 4A is a function block diagram of the first battery pack output measurement device 11 and FIG. 4B is a function block diagram of the first confining pressure adjustment device 12. FIG. 4C is a function block diagram of the second battery pack output measurement device 14 and FIG. 4D is a function block diagram of the second confining pressure adjustment device 15.

The confining pressure application device 10 tightens the bolt 8 of the confining jig 8 of the battery pack 2 conveyed by the conveyance device 91 at a predetermined tightening amount in order to apply a fixed confining pressure to the battery pack 2. When the confining pressure is applied to the battery pack 2, the output of the battery pack 2 may be a desired value. The battery pack 2 conveyed to the confining pressure application device 10 has already been charged.

The first battery pack output measurement device 11 includes a battery pack identification unit 110, a first battery pack output measurement unit 111, a first battery pack output storage unit 112, and a first battery pack output notification unit 113. The battery pack identification unit 110 reads an identification number attached to the battery pack 2 conveyed by the conveyance device 91 and notifies the first battery pack output storage unit 112 of the read identification number. The first battery pack output measurement unit 111 measures the output of the battery pack 2 and notifies the first battery pack output storage unit 112 of the measured output. The first battery pack output storage unit 112 stores the identification number of the battery pack 2 read by the battery pack identification unit 110 and the output measured by the first battery pack output measurement unit 111 in association with each other. The first battery pack output notification unit 113 notifies the first confining pressure adjustment device 12 of the output stored in the first battery pack output storage unit 112 in association with the identification number.

The first confining pressure adjustment device 12 includes a battery pack identification unit 120, a first battery pack output acquisition unit 121, a first lowest output determination unit 122, a first application confining pressure determination unit 123, a first confining pressure application unit 124, and a first application confining pressure storage unit 125.

The battery pack identification unit 120 reads an identification number attached to the battery pack 2 conveyed by the conveyance device 91 from the first battery pack output measurement device 11 and notifies the first lowest output determination unit 122 of the read identification number. The first battery pack output acquisition unit 121 acquires the output notified by the first battery pack output notification unit 113 and notifies the first lowest output determination unit 122 and the first application confining pressure determination unit 123 of the acquired output. The first lowest output determination unit 122 stores the identification number of the battery pack 2 read by the battery pack identification unit 120 and the output notified by the first battery pack output acquisition unit 121 in association with each other. After storing the outputs of all the battery packs 2 that form the all-solid battery 1, the first lowest output determination unit 122 determines the battery pack 2 whose output is the lowest of the stored outputs and the output thereof, and notifies the first application confining pressure determination unit 123 of the battery pack 2 whose output is the lowest and the output thereof. The first application confining pressure determination unit 123 acquires the output acquired from the first battery pack output acquisition unit 121 and the battery pack 2 whose output is the lowest and the output thereof from the first lowest output determination unit 122. The first application confining pressure determination unit 123 determines the confining pressures that are applied to the plurality of battery packs 2, respectively, so that the outputs of all the battery packs 2 are equal to the output of the battery pack 2 whose output is the lowest. The first application confining pressure determination unit 123 determines the confining pressures that are applied to the plurality of battery packs 2, respectively, from the differences between the respective outputs and the output of the battery pack 2 whose output is the lowest. In an example, the first application confining pressure determination unit 123 internally stores a conversion table for determining the confining pressures that are applied to the battery packs 2 from the differences between the respective outputs and the output of the battery pack 2 whose output is the lowest. The first application confining pressure determination unit 123 notifies the first confining pressure application unit 124 and the first application confining pressure storage unit 125 of the determined confining pressure in association with the identification number of the battery pack 2. The first confining pressure application unit 124 loosens the bolt 83 of the battery pack so as to achieve a confining pressure in accordance with the confining pressure notified by the first application confining pressure determination unit 123.

The aging device 13 performs aging processing by leaving the battery pack 2 for a predetermined period of time at predetermined temperatures. The aging device 13 tests whether the battery pack 2 has the desired electrical characteristics by performing the aging processing and at the same time, readjusts the confining pressure of the battery pack 2, when the output of the battery pack 2 has changed due to the aging processing. The aging device 13 mounts the battery pack 2 on the conveyance device 91 after the aging processing has been completed.

The second battery pack output measurement device 14 includes a battery pack identification unit 140, a second battery pack output measurement unit 141, a second battery pack output storage unit 142, and a second battery pack output notification unit 143. The battery pack identification unit 140 and the second battery pack output measurement unit 141 have the same functions as those of the battery pack identification unit 110 and the first battery pack output measurement unit 111, respectively. Further, the second battery pack output storage unit 142 and the second battery pack output notification unit 143 have the same functions as those of the first battery pack output storage unit 112 and the first battery pack output notification unit 113, respectively.

The second battery pack output measurement device 14 measures the output of the battery pack 2 conveyed by the conveyance device 91 from the aging device 13 and notifies the second confining pressure adjustment device 15 of the measured output.

The second confining pressure adjustment device 15 includes a battery pack identification unit 150, a second battery pack output acquisition unit 151, a second lowest output determination unit 152, a second application confining pressure determination unit 153, a second battery pack confining pressure application unit 154, and a second battery pack application confining pressure storage unit 155. The battery pack identification unit 150, the second battery pack output acquisition unit 151, and the second lowest output determination unit 152 have the same functions as those of the battery pack identification unit 120, the first battery pack output acquisition unit 121, and the first lowest output determination unit 122, respectively. Further, the second application confining pressure determination unit 153, the second battery pack confining pressure application unit 154, and the second battery pack application confining pressure storage unit 155 have the same functions as those of the first application confining pressure determination unit 123, the first confining pressure application unit 124, and the first application confining pressure storage unit 125, respectively.

The second confining pressure adjustment device 15 readjusts the confining pressure by loosening the bolt 83 of the battery pack 2 conveyed from the second battery pack output measurement device 14 so that the outputs of all the battery packs 2 become equal to the output of the battery pack 2 whose output is the lowest.

The battery assembling device 16 assembles the all-solid battery 1 by electrically connecting in parallel the battery packs 2 conveyed by the conveyance device 91 from the second confining pressure adjustment device 15 via the positive electrode 3 and the negative electrode 4.

Figure 5B:
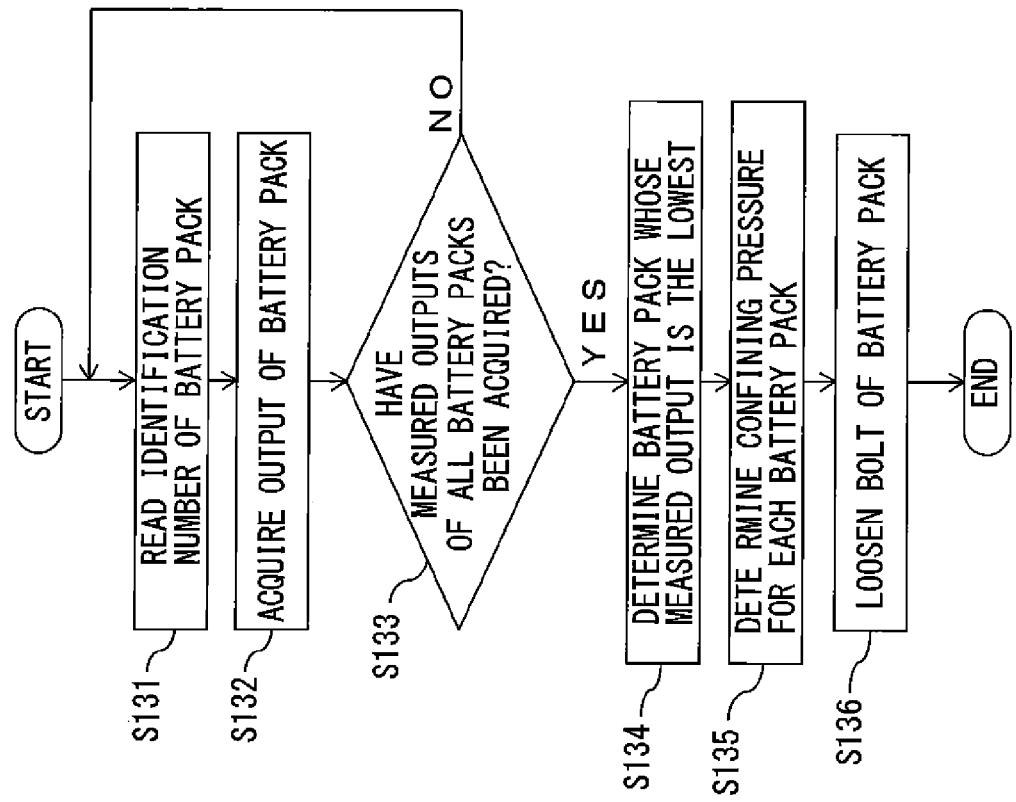
FIG. 5B is a flowchart illustrating processing of the first confining pressure adjustment device illustrated in FIG. 3A in detail.
Figure 5A:
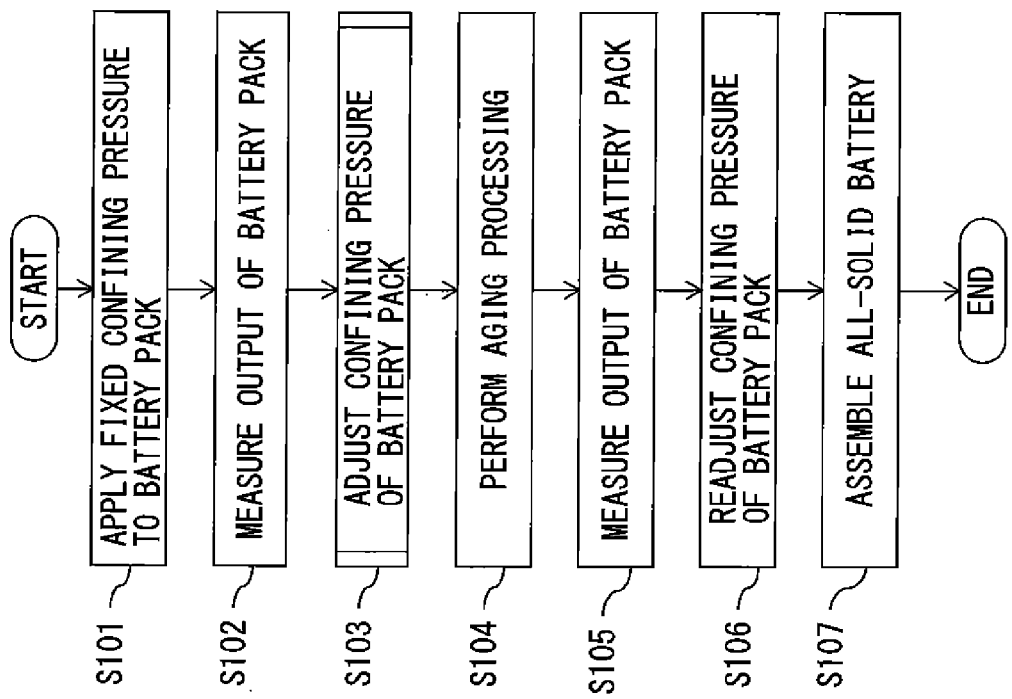
FIG. 5A is a flowchart illustrating a processing flow of the all-solid battery manufacturing device illustrated in FIG. 3A.

FIG. 5A is a flowchart illustrating a processing flow of the all-solid battery manufacturing device 101 and FIG. 5B is a flowchart illustrating processing of the first confining pressure adjustment device 12 in detail.

First, at step S101, the confining pressure application device 10 tightens the bolt 8 of the confining jig 8 of the battery pack 2 conveyed by the conveyance device 91 at a predetermined tightening amount in order to apply a fixed confining pressure to the battery pack 2.

Next, at step S102, the first battery pack output measurement device 11 measures the output of the battery pack 2 to which the fixed confining pressure has been applied at step S101 and notifies the first confining pressure adjustment device 12 of the measured output.

Next, at step S103, the first confining pressure adjustment device 12 adjusts the confining pressure so that the outputs of all the battery packs 2 become equal to the output of the battery pack 2 whose output is the lowest by loosening the bolt 83 of the battery pack 2 in accordance with the output measured at step S102.

In more detail, first, at step S131, the battery pack identification unit 120 reads an identification number attached to the battery pack 2 conveyed by the conveyance device 91 from the first battery pack output measurement device 11 and notifies the first lowest output determination unit 122 of the read identification number. Next, at step S132, the first battery pack output acquisition unit 121 acquires the output measured by the first battery pack output measurement device 11 and notifies the first lowest output determination unit 122 and the first application confining pressure determination unit 123 of the acquired output. Next, at step S133, the first lowest output determination unit 122 determines whether the outputs of all the battery packs 2 that form the all-solid battery 1 have been acquired. If the first lowest output determination unit 122 determines that the outputs of all the battery packs 2 have not been acquired yet, the processing returns to the step S131. If the first lowest output determination unit 122 determines that the outputs of all the battery packs 2 have been acquired, the processing proceeds to step S134. When the processing proceeds to step S134, the first lowest output determination unit 122 determines the battery pack 2 whose output is the lowest and the output thereof. Next, at step S135, the first application confining pressure determination unit 123 determines confining pressures that are applied to the plurality of battery packs 2, respectively, so that the outputs of all the battery packs 2 become equal to the output of the battery pack 2 whose output is the lowest. Then, at step S136, the first confining pressure application unit 124 loosens the bolt 83 of the battery pack 2 so as to achieve a confining pressure in accordance with the confining pressure determined at step S135.

Next, at step S104, the aging device 13 performs aging processing by leaving the battery pack 2 whose confining pressure has been adjusted at step S103, for a predetermined period of time at predetermined temperatures.

Next, at step S105, the second battery pack output measurement device 14 measures the output of the battery pack 2, after the aging processing has been completed.

Next, at step S106, the second confining pressure adjustment device 15 readjusts the confining pressure so that the outputs of all the battery packs 2 are equal to the output of the battery pack 2 whose output is the lowest by loosening the bolt 83 of the battery pack 2 in accordance with the output measured at step S105.

Then, at step S107, the battery assembling device 16 assembles the all-solid battery 1 by electrically connecting in parallel the battery packs 2 whose confining pressure has been adjusted at step S106 via the positive electrode 3 and the negative electrode 4.

Next, an all-solid battery manufacturing device according to a second embodiment illustrated in FIG. 3B is explained.

An all-solid battery manufacturing device 102 according to the second embodiment includes a single battery output measurement device 20, a single battery classification device 21, a battery pack assembling device 22, a confining pressure application device 23, a first battery pack output measurement device 24, a first confining pressure adjustment device 25, and an aging device 26. The all-solid battery manufacturing device 102 further includes a second battery pack output measurement device 27, a second confining pressure adjustment device 28, a battery assembling device 29, and a conveyance device 92.

The confining pressure application device 23, the first battery pack output measurement device 24, the first confining pressure adjustment device 25, and the aging device 26 have the same configurations and functions as those of the confining pressure application device 10, the first battery pack output measurement device 11, the first confining pressure adjustment device 12, and the aging device 13, respectively. Further, the second battery pack output measurement device 27, the second confining pressure adjustment device 28, the battery assembling device 29, and the conveyance device 92 have the same configurations and functions as those of the second battery pack output measurement device 14, the second confining pressure adjustment device 15, the battery assembling device 16, and the conveyance device 91, respectively. The all-solid battery manufacturing device 102 differs from the all-solid battery manufacturing device 101 in including the single battery output measurement device 20, the single battery classification device 21, and the battery pack assembling device 22.

Figure 6A:
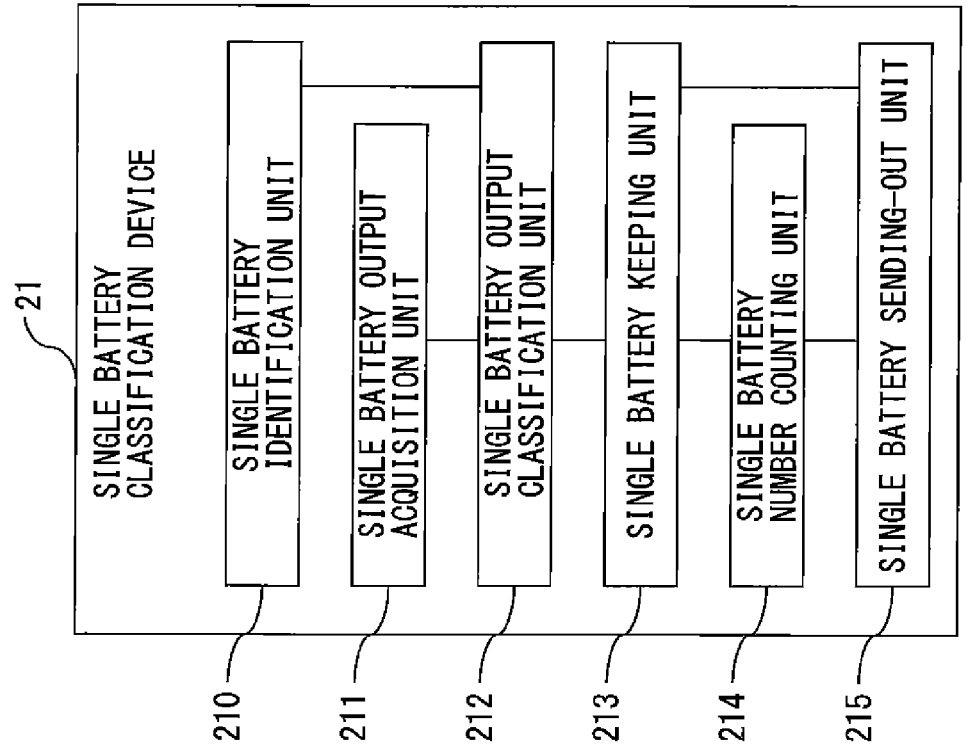
FIG. 6A is a function block diagram of a single battery output measurement device illustrated in FIG. 3B.
Figure 6B:
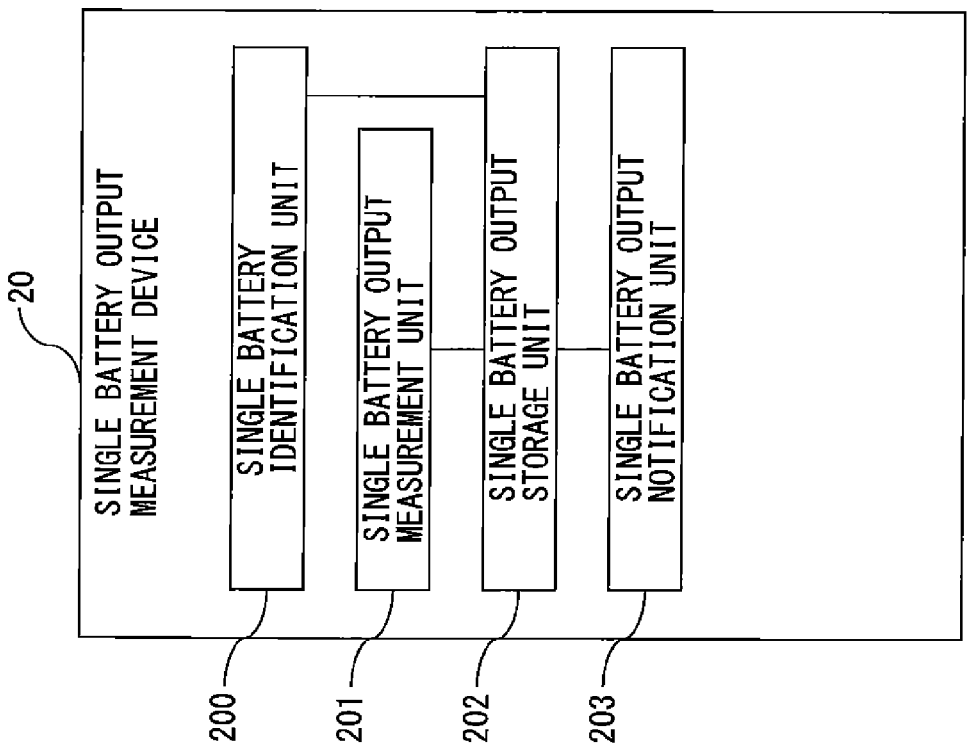
FIG. 6B is a function block diagram of a single battery classification device illustrated in FIG. 3B.

FIG. 6A is a function block diagram of the single battery output measurement device 20 and FIG. 6B is a function block diagram of the single battery classification device 21.

The single battery output measurement device 20 includes a single battery identification unit 200, a single battery output measurement unit 201, a single battery output storage unit 202, and a single battery output notification unit 203. The single battery identification unit 200 reads an identification number attached to the single battery 7 conveyed by the conveyance device 92 and notifies the single battery output storage unit 202 of the read identification number. The single battery output measurement unit 201 measures the output of the single battery 7 and notifies the single battery output storage unit 202 of the measured output. The single battery output storage unit 202 stores the identification number of the single battery 7 read by the single battery identification unit 200 and the output measured by the single battery output measurement unit 201 in association with each other. The single battery output notification unit 203 notifies the single battery classification device 21 of the output stored in the single battery output storage unit 202 in association with the identification number.

The single battery classification device 21 includes a single battery identification unit 210, a single battery output acquisition unit 211, a single battery output classification unit 212, a single battery keeping unit 213, a single battery number counting unit 214, and a single battery sending-out unit 215.

The single battery identification unit 210 reads an identification number attached to the single battery 7 conveyed by the conveyance device 92 and notifies the single battery output classification unit 212 of the read identification number. The single battery output acquisition unit 211 acquires the output notified by the single battery output notification unit 203 of the single battery output measurement device 20 and notifies the single battery output classification unit 212 of the acquired output.

The single battery output classification unit 212 stores the identification number of the single battery 7 read by the single battery identification unit 210 and the output notified by the single battery output acquisition unit 211 in association with each other. Next, the single battery output classification unit 212 classifies the single batteries 7 into a plurality of groups based on the stored outputs. For example, the single battery output classification unit 212 classifies the single battery 7 whose output is between a first threshold output and a second threshold output larger than the first threshold output into a first group. The single battery output classification unit 212 classifies the single battery 7 whose output is between the second threshold output and a third threshold output larger than the second threshold output into a second group. The single battery output classification unit 212 classifies the single battery 7 whose output is between an Nth threshold output and an (N+1)th threshold output larger than the Nth threshold output into an Nth group. It is possible to form a plurality of groups having single batteries 7 whose outputs are included in a predetermined range, since the single battery output classification unit 212 classifies the single battery 7 whose output is included in a predetermined range into each group.

The single battery keeping unit 213 keeps the single batteries 7 classified by the single battery output classification unit 212 for each group. The single battery number counting unit 214 counts the single batteries 7 kept by the single battery keeping unit 213 for each group. When the number of the counted single batteries 7 reaches a predetermined number, the single number counting unit 214 notifies the single battery sending-out unit 215 of the name of the group whose number of the counted single batteries 7 has reached a predetermined number, and sending-out instructions. When the single battery sending-out unit 215 receives sending-out instructions, the single battery sending-out unit 215 sends out the single batteries 7 included in the group whose number of the counted single batteries 7 has reached a predetermined number to the conveyance device 92 from the single battery keeping unit 213.

The battery pack assembling device 22 assembles the group of the single batteries 7 conveyed by the conveyance device 92 from the single battery classification device 21 into the battery pack 2.

Figure 7B:
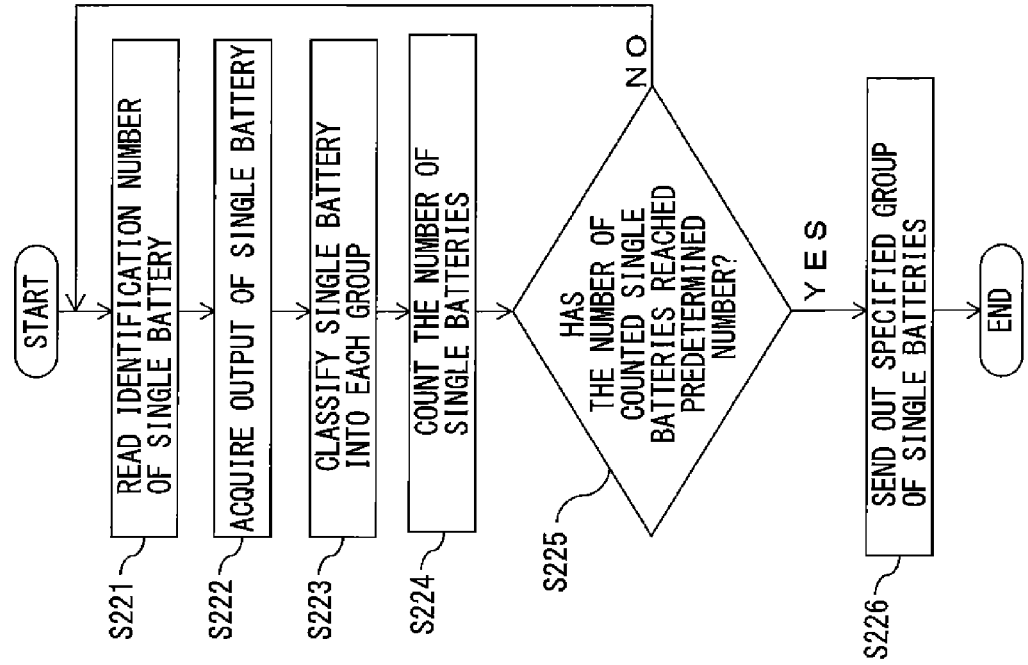
FIG. 7B is a flowchart illustrating processing of a single battery classification device illustrated in FIG. 3B in detail.
Figure 7A:
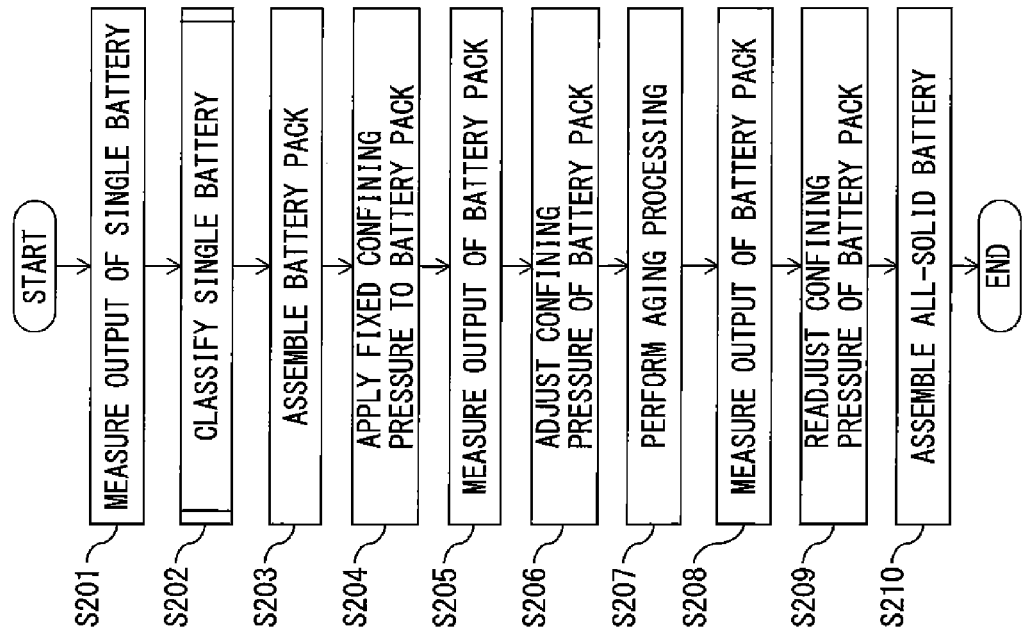
FIG. 7A is a flowchart illustrating a processing flow of the all-solid battery manufacturing device illustrated in FIG. 3B.

FIG. 7A is a flowchart illustrating a processing flow of the all-solid battery manufacturing device 102 and FIG. 7B is a flowchart illustrating processing of the single battery classification device 21 in detail.

First, at step S201, the single battery output measurement device 20 measures the output of the single battery 7 conveyed by the conveyance device 92 and notifies the single battery classification device 21 of the measured output.

Next, at step S202, the single battery classification device 21 classifies the single battery 7 according to the output measured by the single battery output measurement device 20.

In more detail, first, at step S221, a battery pack identification unit 220 reads an identification number attached to the single battery 7 conveyed by the conveyance device 92 from the single battery output measurement device 20 and notifies the first lowest output determination unit 122 of the read identification number. Next, at step S222, the single battery output acquisition unit 211 acquires the output measured by the single battery output measurement device 20 and notifies the single battery output classification unit 212 of the acquired output. Next, at step S223, the single battery output classification unit 212 classifies the single batteries 7 into a plurality of groups based on the outputs measured by the single battery output measurement device 20 and the single battery keeping unit 213 keeps the single batteries 7 classified by the single battery output classification unit 212 for each group. Next, at step S224, the single battery number counting unit 214 counts the single batteries 7 kept by the single battery keeping unit 213 for each group. Next, at step S225, the single battery number counting unit 214 determines whether the number of the counted single batteries 7 has reached a predetermined number. If the single battery number counting unit 214 determines that the number of the counted single batteries 7 has reached a predetermined number, the processing proceeds to step S226. If the single battery number counting unit 214 determines that the number of the counted single batteries 7 has not reached a predetermined number yet, the processing returns to step S221. When the processing proceeds to step S226, the single battery number counting unit 214 notifies the single battery sending-out unit 215 of the name of the group whose number of the counted single batteries 7 has reached a predetermined number and sending-out instructions. Then, the single battery sending-out unit 215 sends out the single batteries 7 included in the group whose number of the counted single batteries 7 has reached a predetermined number to the conveyance device 9 from the single battery keeping unit 213.

Next, at step S203, the battery pack assembling device 22 assembles the group of the single batteries 7 conveyed by the conveyance device 92 from the single battery classification device 21 into the battery pack 2.

Next, at step S204, the confining pressure application device 23 tightens the bolt 83 of the confining jig 8 of the battery pack 2 assembled by the battery pack assembling device 22 by a predetermined tightening amount in order to apply a fixed confining pressure to the battery pack 2. Next, at step S205, the first battery pack output measurement device 24 measures the output of the battery pack 2 to which a fixed confining pressure has been applied at step S204 and notifies the first confining pressure adjustment device 25 of the measured output. Next, at step S206, the first confining pressure adjustment device 25 adjusts the confining pressure so that the outputs of all the battery packs 2 become equal to the output of the battery pack 2 whose output is the lowest by loosening the bolt 83 of the battery pack 2 in accordance with the output measured at step S205. Next, at step S207, the aging device 26 performs aging processing by leaving as it is the battery pack 2 whose confining pressure has been adjusted at step S206 for a predetermined period of time at predetermined temperatures. Next, at step S208, the second battery pack output measurement device 27 measures the output of the battery pack 2 for which the aging processing has been completed. Next, at step S209, the second confining pressure adjustment device 28 readjusts the confining pressure so that the outputs of all the battery packs 2 become equal to the output of the battery pack 2 whose output is the lowest by loosening the bolt 83 of the battery pack 2 in accordance with the output measured at step S208. Then, at step S210, the battery assembling device 29 assembles the all-solid battery 1 by electrically connecting in parallel the battery packs 2 whose confining pressure has been adjusted at step S209 via the positive electrode 3 and the negative electrode 4.

Next, an all-solid battery manufacturing device according to a third embodiment illustrated in FIG. 3C is explained.

An all-solid battery manufacturing device 103 according to the third embodiment includes a single battery output measurement device 30, a single battery classification device 31, a battery pack assembling device 32, a confining pressure application device 33, a first battery pack output measurement device 34, a first confining jig exchange device 35, and an aging device 36. The all-solid battery manufacturing device 103 further includes a second battery pack output measurement device 37, a second confining jig exchange device 38, a battery assembling device 39, and a conveyance device 93.

The single battery output measurement device 30, the single battery classification device 31, and the battery pack assembling device 32 have the same configurations and functions as those of the single battery output measurement device 20, the single battery classification device 21, and the battery pack assembling device 22, respectively. The confining pressure application device 33, the first battery pack output measurement device 34, and the aging device 36 have the same configurations and functions as those of the confining pressure application device 23, the first battery pack output measurement device 24, and the aging device 26, respectively. Further, the second battery pack output measurement device 37, the battery assembling device 39, and the conveyance device 93 have the same configurations and functions as those of the second battery pack output measurement device 27, the battery assembling device 29, and the conveyance device 92, respectively. The all-solid battery manufacturing device 103 differs from the all-solid battery manufacturing device 102 in including the first confining jig exchange device 35 and the second confining jig exchange device 38.

Figure 8B:
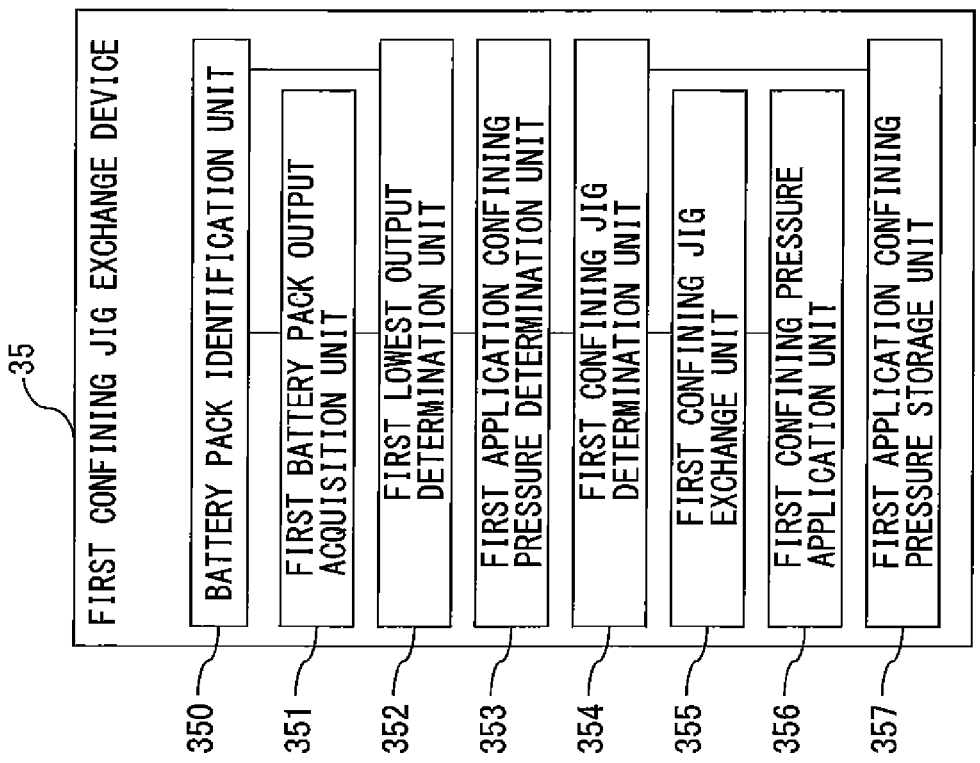
FIG. 8B is a function block diagram of a second confining jig exchange device illustrated in FIG. 3C.
Figure 8A:
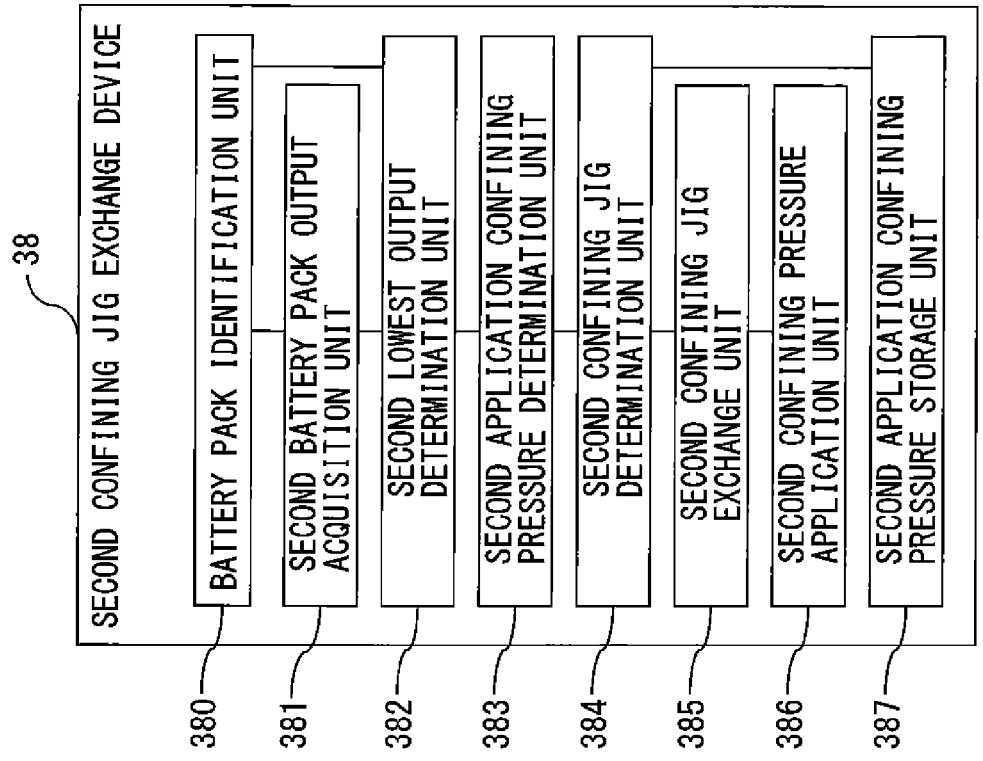
FIG. 8A is a function block diagram of a first confining jig exchange device illustrated in FIG. 3C.

FIG. 8A is a function block diagram of the first confining jig exchange device 35 and FIG. 8B is a function block diagram of the second confining jig exchange device 38.

The first confining jig exchange device 35 includes a battery pack identification unit 350, a first battery pack output acquisition unit 351, a first lowest output determination unit 352, a first application confining pressure determination unit 353, a first confining jig determination unit 354, and a first confining jig exchange unit 355. The first confining jig exchange device 35 further includes a first confining pressure application unit 356 and a first application confining pressure storage unit 357.

The battery pack identification unit 350 reads an identification number attached to the battery pack 2 conveyed by the conveyance device 93 from the first battery pack output measurement device 34 and notifies the first lowest output determination unit 352 of the read identification number. The first battery pack output acquisition unit 351 acquires the output notified by the first battery pack output measurement device 34 and notifies the first lowest output determination unit 352, the first application confining pressure determination unit 353, and the first confining jig determination unit 354 of the acquired output. The first lowest output determination unit 352 stores the identification number of the battery pack 2 read by the battery pack identification unit 350 and the output notified by the first battery pack output acquisition unit 351 in association with each other. After storing the outputs of all the battery packs 2 that form the all-solid battery 1, the first lowest output determination unit 352 determines the battery pack 2 whose output is the lowest of the stored outputs and the output thereof and notifies the first application confining pressure determination unit 353 of the battery pack 2 whose output is the lowest and the output thereof. The first application confining pressure determination unit 353 acquires the output acquired from the first battery pack output acquisition unit 351 and the battery pack 2 whose output is the lowest and the output thereof from the first lowest output determination unit 352. The first application confining pressure determination unit 353 determines the confining pressures that are applied to the plurality of battery packs 2, respectively, so that the outputs of all the battery packs 2 become equal to the output of the battery pack 2 whose output is the lowest. The first application confining pressure determination unit 353 determines the confining pressures that are applied to the plurality of battery packs 2, respectively, from the differences between the respective outputs and the output of the battery pack 2 whose output is the lowest. The first application confining pressure determination unit 353 notifies the first confining jig determination unit 354, the first confining pressure application unit 356, and the first application confining pressure storage unit 357 of the determined confining pressure in association with the identification number of the battery pack 2.

The first confining jig determination unit 354 determines whether the confining pressure determined by the first application confining pressure determination unit 353 is higher than a threshold confining pressure. When determining that the confining pressure is lower than the threshold confining pressure, the first confining jig determination unit 354 determines to exchange the confining jig 8 of the battery pack 2 with a first confining jig. When determining that the confining pressure is higher than the threshold confining pressure, the first confining jig determination unit 354 determines to exchange the confining jig 8 of the battery pack 2 with a second confining jig whose confining pressure is higher than that of the first confining jig. Next, the first confining jig determination unit 354 notifies the first confining jig exchange unit 355 of the determined confining jig. When the determined confining jig is notified by the first confining jig determination unit 354, the first confining jig exchange unit 355 exchanges the confining jig 8 of the battery pack 2 with the determined confining jig. When the first confining jig is notified by the first confining jig determination unit 354, the first confining jig exchange unit 355 exchanges the confining jig 8 of the battery pack 2 with the first confining jig. When the second confining jig is notified by the first confining jig determination unit 354, the first confining jig exchange unit 355 exchanges the confining jig 8 of the battery pack 2 with the second confining jig. The first confining pressure application unit 356 loosens the bolt 83 of the battery pack 2 so as to achieve a confining pressure in accordance with the confining pressure notified by the first application confining pressure determination unit 353.

The second confining jig exchange device 38 includes a battery pack identification unit 380, a second battery pack output acquisition unit 381, a second lowest output determination unit 382, a second application confining pressure determination unit 383, a second confining jig determination unit 384, and a second confining jig exchange unit 385. The second confining jig exchange device 38 further includes a second confining pressure application unit 386 and a second application confining pressure storage unit 387.

The battery pack identification unit 380, the second battery pack output acquisition unit 381, and the second lowest output determination unit 382 have the same functions as those of the battery pack identification unit 350, the first battery pack output acquisition unit 351, and the first lowest output determination unit 352, respectively. Further, the second application confining pressure determination unit 383 and the second confining jig determination unit 384 have the same functions as those of the first application confining pressure determination unit 353 and the first confining jig determination unit 354, respectively. Furthermore, the second confining pressure application unit 386 and the second application confining pressure storage unit 387 have the same functions as those of the first confining pressure application unit 356 and the first application confining pressure storage unit 357, respectively. When the second confining jig determination unit 384 determines the second confining jig to be the confining jig for exchange of the confining jigs while the first confining jig is used, the second confining jig exchange unit 385 exchanges the confining jig from the first confining jig to the second confining jig. When the second confining jig determination unit 384 determines the first confining jig to be the confining jig for exchange of the confining jigs while the second confining jig is used, the second confining jig exchange unit 385 exchanges the confining jig from the second confining jig to the first confining jig.

Figure 9B:
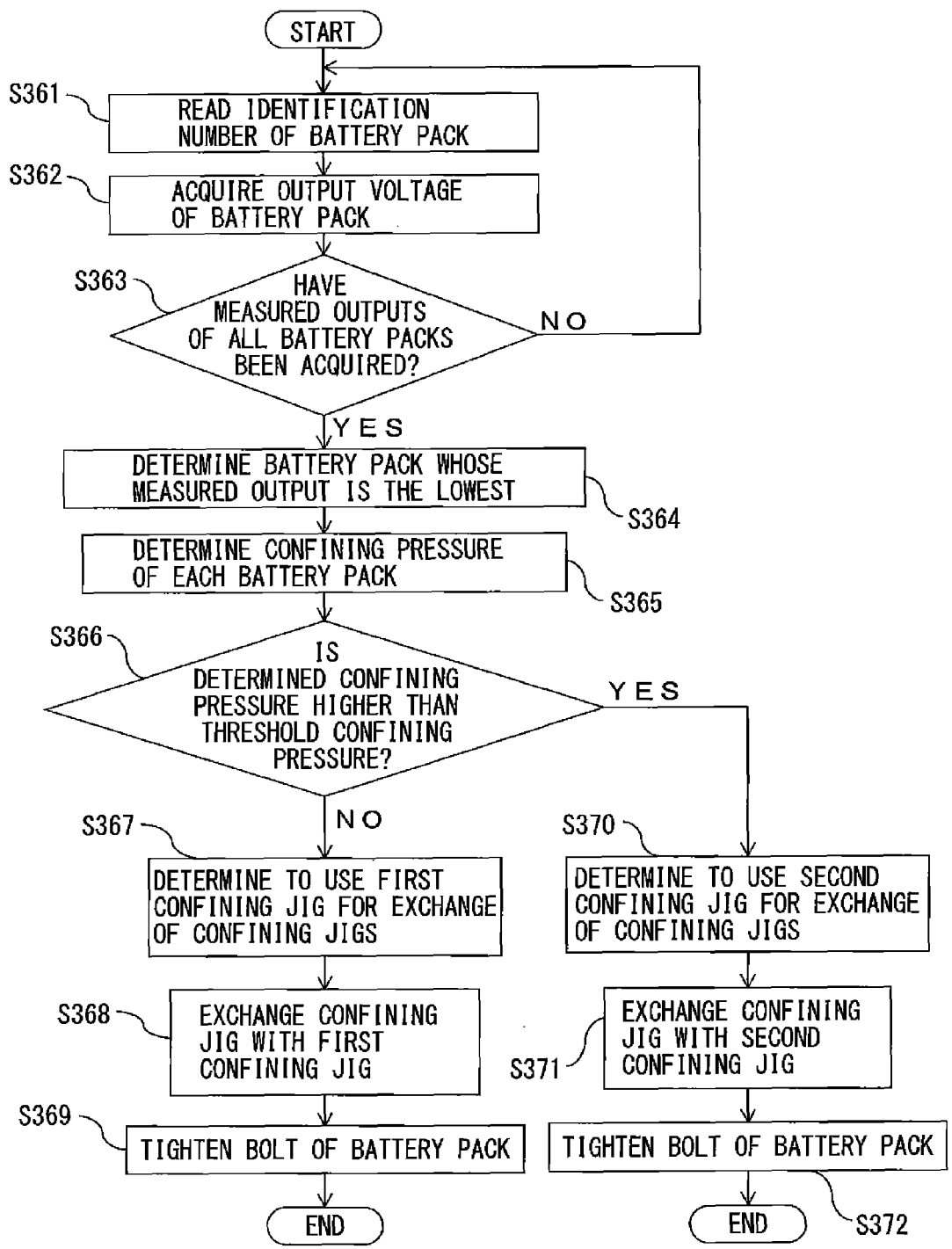
FIG. 9B is a flowchart illustrating processing of a first confining jig exchange device 35 illustrated in FIG. 3C in detail.

FIG. 9A is a flowchart illustrating a processing flow of the all-solid battery manufacturing device 103 and FIG. 9B is a flowchart illustrating processing of the first confining jig exchange device 35 in detail.

First, at step S301, the single battery output measurement device 30 measures the output of the single battery 7 conveyed by the conveyance device 93 and notifies the single battery classification device 31 of the measured output. Next, at step S302, the single battery classification device 31 classifies the single battery 7 according to the output measured by the single battery output measurement device 30. Next, at step S303, the battery pack assembling device 32 assembles the group of the single batteries 7 conveyed by the conveyance device 93 from the single battery classification device 31 into the battery pack 2. Next, at step S304, the confining pressure application device 33 tightens the bolt 83 of the confining jig 8 of the battery pack 2 assembled by the battery pack assembling device 32 by a predetermined tightening amount in order to apply a fixed confining pressure to the battery pack 2. Next, at step S305, the first battery pack output measurement device 34 measures the output of the battery pack 2 to which a fixed confining pressure has been applied at step S304 and notifies the first confining jig exchange device 35 of the measured output. Next, at step S306, the first confining jig exchange device 35 exchanges the confining jig 8 of the battery pack 2 with another in accordance with the output measure at step S305. Next, the first confining pressure adjustment device 25 adjusts the confining pressure so that the outputs of all the battery pack 2 are equal to the output of the battery pack whose output is the lowest.

In more detail, first, at step S361, the battery pack identification unit 350 reads an identification number attached to the battery pack 2 conveyed by the conveyance device 93 from the first battery pack output measurement device 34 and notifies the first lowest output determination unit 352 of the read identification number. Next, at step S362, the first battery pack output acquisition unit 351 acquires the output measured by the first battery pack output measurement device 34 and notifies the first lowest output determination unit 352 and the first application confining pressure determination unit 353 of the acquired output. Next, at step S363, the first lowest output determination unit 352 determines whether the outputs of all the battery packs 2 that form the all-solid battery 1 have been acquired. If the first lowest output determination unit 352 determines that the outputs of all the battery packs 2 have not been acquired yet, the processing returns to step S361. If the first lowest output determination unit 352 determines that the outputs of all the battery packs 2 have been acquired, the processing proceeds to step S364. When the processing proceeds to step S364, the first lowest output determination unit 352 determines the battery pack 2 whose output is the lowest and the output thereof. Next, at step S365, the first application confining pressure determination unit 353 determines the confining pressure that are applied to the plurality of battery packs 2, respectively, so that the outputs of all the battery packs 2 become equal to the output of the battery pack 2 whose output is the lowest.

Next, at step S366, the first confining jig determination unit 354 determines whether the confining pressure determined by the first application confining pressure determination unit 353 is higher than a threshold confining pressure. If the first confining jig determination unit 354 determines that the confining pressure determined by the first application confining pressure determination unit 353 is lower than the threshold confining pressure, the processing proceeds to step S367. If the first confining jig determination unit 354 determines that the confining pressure determined by the first application confining pressure determination unit 353 is higher than the threshold confining pressure, the processing proceeds to step S370.

When the processing proceeds to step S367, the first confining jig determination unit 354 determines to exchange the confining jig 8 of the battery pack 2 with the first confining jig. Next, at step S368, the first confining jig exchange unit 355 exchanges the confining jig 8 of the battery pack 2 with the first confining jig. Then, at step S369, the first confining pressure application unit 356 tightens the bolt 83 of the battery pack 2 so as to achieve a confining pressure in accordance with the confining pressure determined at step S365.

When the processing proceeds to step S369, the first confining jig determination unit 354 determines to exchange the confining jig 8 of the battery pack 2 with the second confining jig whose confining pressure is higher than that of the first confining jig. Next, at step S370, the first confining jig exchange unit 355 exchanges the confining jig 8 of the battery pack 2 with the second confining jig. Then, at step S371, the first confining pressure application unit 356 tightens the bolt 83 of the battery pack 2 so as to achieve a confining pressure in accordance with the confining pressure determined at step S364.

Next, at step S307, the aging device 36 performs aging processing by leaving as it is the battery pack 2 whose confining pressure has been adjusted so that the output has a predetermined voltage at step S206 for a predetermined period of time at predetermined temperatures. Next, at step S308, the second battery pack output measurement device 37 measures the output of the battery pack 2 for which the aging processing has been completed. Next, at step S309, the second confining jig exchange device 38 exchanges the confining jig 8 of the battery pack 2 with another in accordance with the output measured at step S308. Next, the second confining jig exchange device 38 readjusts the confining pressure so that the outputs of all the battery packs 2 become equal to the output of the battery pack 2 whose output is the lowest. Then, at step S310, the battery assembling device 39 assembles the all-solid battery 1 by electrically connecting in parallel the battery packs 2 whose confining pressure has been adjusted at step S309 via the positive electrode 3 and the negative electrode 4.

Next, an all-solid battery manufacturing device according to a fourth embodiment illustrated in FIG. 3D is explained.

An all-solid battery manufacturing device 104 according to the fourth embodiment includes a battery disassembling device 40, a confining pressure application device 41, a battery pack output measurement device 42, a confining pressure adjustment device 43, a battery assembling device 44, and a conveyance device 94. The all-solid battery manufacturing device 104 is a device that disassembles the all-solid battery 1 when performing maintenance and inspection of the all-solid battery 1 mounted on a vehicle, not illustrated, and assembles the all-solid battery 1 again after adjusting the confining pressure of the battery pack 2.

The battery disassembling device 40 disassembles the all-solid battery 1 conveyed by the conveyance device 94 by removing the internal wires of the all-solid battery 1 and takes out a plurality of battery packs 2. Next, the battery disassembling device 40 charges each of the plurality of battery packs 2 that have been taken out.

The confining pressure application device 41 tightens the bolt 83 of the confining jig 8 of the charged battery pack 2 by a predetermined tightening amount in order to apply a fixed confining pressure to the battery pack 2. The confining pressure that the confining pressure application device 10 applies to the battery pack 2 is a maximum confining pressure that can be applied to the confining jig 8.

The battery pack output measurement device 42 has the same function as that of the first battery pack output measurement device 11. The battery pack output measurement device 42 measures the output of the battery pack 2 conveyed by the conveyance device 94 from the confining pressure application device 41 and notifies the confining pressure adjustment device 43 of the measured output.

Figure 10:
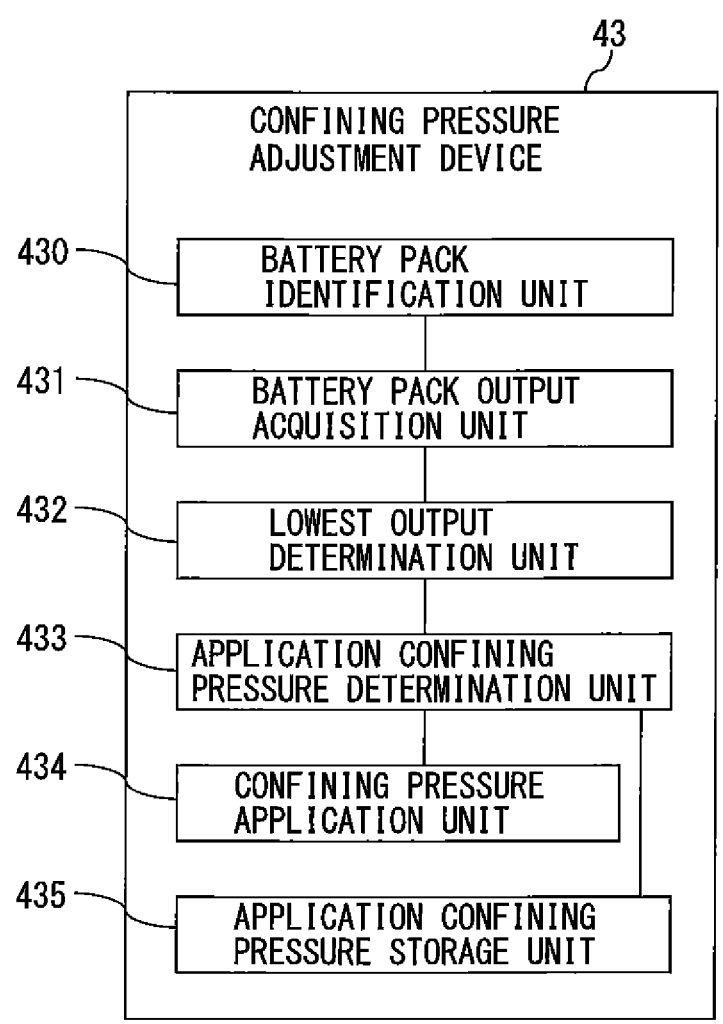
FIG. 10 is a function block diagram of the confining pressure adjustment device illustrated in FIG. 3D.

FIG. 10 is a function block diagram of the confining pressure adjustment device 43.

The confining pressure adjustment device 43 includes a battery pack identification unit 430, a battery pack output acquisition unit 431, a lowest output determination unit 432, an application confining pressure determination unit 433, a confining pressure application unit 434, and an application confining pressure storage unit 435.

The battery pack identification unit 430 reads an identification number attached to the battery pack 2 conveyed by the conveyance device 94 from the battery pack output measurement device 42 and notifies the lowest output determination unit 432 of the read identification number. The battery pack output acquisition unit 431 acquires the output notified by the battery pack output measurement device 42 and notifies the lowest output determination unit 432 and the application confining pressure determination unit 433 of the acquired output.

The lowest output determination unit 432 stores the identification number of the battery pack 2 read by the battery pack identification unit 430 and the output notified by the battery pack output acquisition unit 431 in association with each other. After storing the outputs of all the battery packs 2, the lowest output determination unit 432 determines the battery pack 2 whose output is the lowest of the stored outputs and the output thereof and notifies the application confining pressure determination unit 433 of the battery pack 2 whose output is the lowest and the output thereof.

The application confining pressure determination unit 433 acquires the output acquired from the battery pack output acquisition unit 431 and the battery pack 2 whose output is the lowest and the output thereof from the lowest output determination unit 432. The application confining pressure determination unit 433 determines the confining pressures that are applied to the plurality of battery packs 2, respectively, so that the outputs of all the battery packs 2 become equal to the output of the battery pack 2 whose output is the lowest. The application confining pressure determination unit 433 determines the confining pressures that are applied to the plurality of battery packs 2, respectively, from the differences between the respective outputs and the output of the battery pack 2 whose output is the lowest. In one example, the application confining pressure determination unit 433 internally stores a conversion table for determining the confining pressures that are applied to the battery pack 2 from the differences between the respective outputs and the output of the battery pack 2 whose output is the lowest. The application confining pressure determination unit 433 notifies the confining pressure application unit 434 and the application confining pressure storage unit 435 of the determined application pressure in association with the identification number of the battery pack 2. The confining pressure application unit 434 loosens the bolt 83 of the battery pack 2 so as to achieve a confining pressure in accordance with the confining pressure notified by the application confining pressure determination unit 433.

The battery assembling device 44 assembles the all-solid battery 1 by electrically connecting in parallel the battery packs 2 conveyed by the conveyance device 94 from the confining pressure adjustment device 43 via the positive electrode 3 and the negative electrode 4.

Figure 11B:
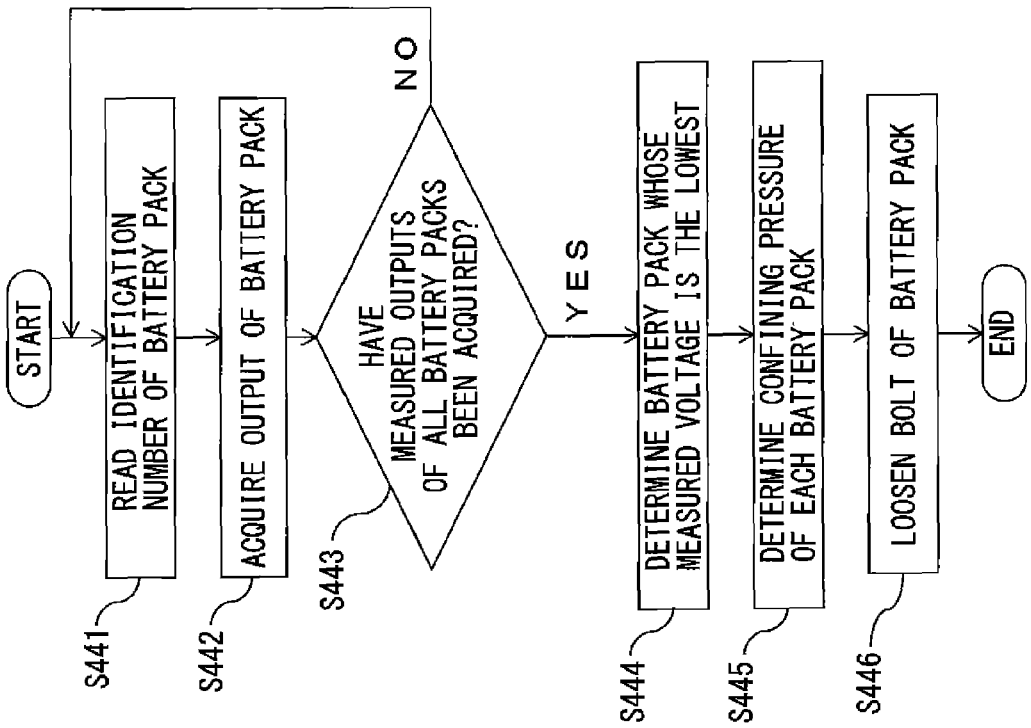
FIG. 11B is a flowchart illustrating processing of the confining pressure adjustment device illustrated in FIG. 3D in detail.
Figure 11A:
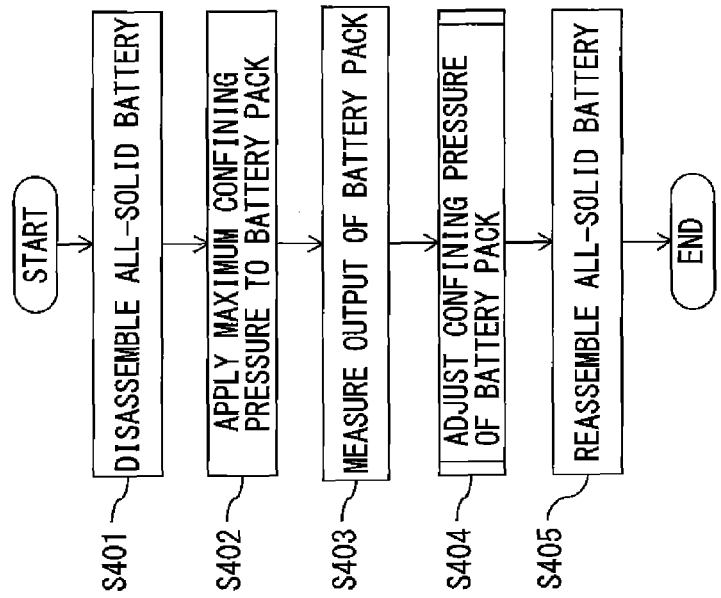
FIG. 11A is a flowchart illustrating a processing flow of the all-solid battery manufacturing device illustrated in FIG. 3D.

FIG. 11A is a flowchart illustrating a processing flow of the all-solid battery manufacturing device 104 and FIG. 11B is a flowchart illustrating processing of the confining pressure adjustment device 43 in detail.

First, at step S401, the battery disassembling device 40 disassembles the all-solid battery 1 conveyed by the conveyance device 94 by removing the internal wires and takes out a plurality of battery packs 2, and then, charges each of the plurality of battery packs 2 that have been taken out. Next, at step S402, the confining pressure application device 41 applies the maximum confining pressure that can be applied to each of the plurality of battery packs 2 by tightening each of the bolts 83 of the confining jigs 8 of the plurality of charged battery packs 2 by a predetermined tightening amount. Then, at step S403, the battery pack output measurement device 42 measures the output of the battery pack 2 conveyed by the conveyance device 94 from the confining pressure application device 41 and notifies the confining pressure adjustment device 43 of the measured output. Next, at step S404, the confining pressure adjustment device 43 adjusts the confining pressure so that the outputs of all the battery packs 2 become equal to the output of the battery pack 2 whose output is the lowest by loosening the bolt 83 of the battery pack 2 in accordance with the output measured at step S403.

In more detail, first, at step S441, the battery pack identification unit 430 reads an identification number attached to the battery pack 2 conveyed by the conveyance device 94 from the battery pack output measurement device 42 and notifies the lowest output determination unit 432 of the read identification number. Next, at step S442, the battery pack output acquisition unit 431 acquires the output measured by the battery pack output measurement device 42 and notifies the lowest output determination unit 432 and the application confining pressure determination unit 433 of the acquired output. Next, at step S433, the lowest output determination unit 432 determines whether the outputs of all the battery packs 2 that form the all-solid battery 1 have been acquired. If the lowest output determination unit 432 determines that the outputs of all the battery packs 2 have not been acquired yet, the processing returns to step S441. If the lowest output determination unit 432 determines that the outputs of all the battery packs 2 have been acquired, the processing proceeds to step S444. When the processing proceeds to step S444, the lowest output determination unit 432 determines the battery pack 2 whose output is the lowest and the output thereof. Next, at step S445, the application confining pressure determination unit 433 determines the confining pressures that are applied to the plurality of battery packs 2, respectively, so that the outputs of all the battery packs 2 become equal to the output of the battery pack 2 whose output is the lowest. Then, at step S446, the confining pressure application unit 434 loosens each of the bolts 83 of the plurality of battery packs 2 so as to achieve a confining pressure in accordance with the confining pressure determined at step S445.

Then, at step S405, the battery assembling device 44 reassembles the all-solid battery 1 by electrically connecting in parallel the battery packs 2 whose confining pressure has been adjusted at step S404 via the positive electrode 3 and the negative electrode 4.

In the all-solid battery manufacturing device 101 according to the first embodiment, each of the first confining pressure adjustment device 12 and the second confining pressure adjustment device 15 adjusts the confining pressure of confining a plurality of battery packs 2 so that the outputs of the plurality of battery packs 2 are equal each other. In the all-solid battery manufacturing device 101 according to the first embodiment, the confining pressures of the plurality of battery packs 2 are adjusted so that the outputs are equal each other, and therefore there are no variations in the output of the plurality of battery packs 2 and the deterioration of the all-solid battery 1 due to the overcharge and the overdischarge of the all-solid battery 1 is suppressed. Further, in the all-solid battery manufacturing device 101 according to the first embodiment, the confining pressures of the other battery packs are reduced by adjustment so that the electrical characteristics of the other battery packs are equal to the electrical characteristics of the battery pack whose electrical characteristics have been determined to be the worst, and therefore the outputs of all the battery packs may have the same value.

In the all-solid battery manufacturing device 102 according to the second embodiment, the single battery classification device 21 classifies the single battery 7 according to the output measured by the single battery output measurement device 20 and the battery pack assembling device 22 assembles a group of the single batteries 7 into which classified by the single battery classification device 21 into the battery pack 2. In the all-solid battery manufacturing device 102 according to the second embodiment, the battery pack 2 is assembled from the single batteries 7 whose outputs are substantially equal each other, and therefore the variations in the output of the plurality of battery packs will become further smaller.

In the all-solid battery manufacturing device 103 according to the third embodiment, each of the first confining jig exchange device 35 and the second confining jig exchange device 38 selects a confining jig in accordance with the confining pressure by exchanging the confining jig 8 of the battery pack 2 with another in accordance with the output. In the all-solid battery manufacturing device 103 according to the third embodiment, a confining jig in accordance with the confining pressure is selected, and therefore the size of the all-solid battery 1 is optimized and it is possible to reduce the volume and weight of the all-solid battery 1.

In the all-solid battery manufacturing device 104 according to the fourth embodiment, the confining pressure adjustment device 43 adjusts the confining pressure of each of the plurality of battery packs 2 so that the outputs of all the battery packs 2 are equal to the output of the battery pack 2 whose output is the lowest when the maximum confining pressure of the confining jig 8 is applied. In the all-solid battery manufacturing device 104 according to the fourth embodiment, the confining pressures of the battery packs 2 are adjusted so that the outputs are equal to the lowest output when the maximum confining pressure is applied, and therefore an excessive confining pressure is not applied and the variations in the output of the battery packs 2 are suppressed.

In the all-solid battery manufacturing devices 101 to 104, the confining pressure of the battery pack 2 is adjusted by measuring the output of the battery pack 2, but it may also be possible to adjust the confining pressure of the battery pack 2 by measuring other electrical characteristics, such as the internal resistance. Further, in the all-solid battery manufacturing devices 101 to 103, after the aging processing, the confining pressures are readjusted so that the outputs of all the battery packs 2 are equal to the output of the battery pack 2 whose output is the lowest, but it may also be possible to readjust the confining pressure so as to achieve a predetermined output.

In the all-solid battery manufacturing devices 102 and 103, the single battery 7 is classified by measuring the output of the single battery 7, but it may also be possible to classify the single battery 7 by measuring other electrical characteristics, such as the internal resistance.

In the all-solid battery manufacturing device 103, the second confining jig exchange device 38 exchanges the confining jig 8 of the battery pack 2 with another in accordance with the output after the aging processing, but it may also be possible to exchange the confining jig 8 of the battery pack 2 with another in accordance with the output when performing maintenance and inspection of the all-solid battery 1 mounted on a vehicle. Further, in the all-solid battery manufacturing device 103, there are two confining jigs, i.e., the first confining jig and the second confining jig, with which the confining jig 8 is exchanged, but a configuration in which the confining jig 8 is exchanged with one confining jig, or a configuration in which the confining jig 8 can be exchanged with one of three or more confining jigs may be accepted.

1 all-solid battery
2 battery pack
3 positive electrode
4 negative electrode
5 positive electrode collector
6 negative electrode collector
7 single battery
8 confining jig
101 to 104 all-solid battery manufacturing device

What is claimed is:
1. A manufacturing method of an all-solid battery, the method comprising:
fabricating a single battery including a positive electrode layer, a negative electrode layer, and a solid electrolyte layer arranged between the positive electrode layer and the negative electrode layer;
fabricating a plurality of battery packs including the plurality of single batteries;

confining a plurality of battery packs by an equal confining pressure;

measuring the electrical characteristics of the plurality of confined battery packs;

determining the battery pack whose measured electrical characteristics are the worst of the plurality of battery packs;

reducing the confining pressures of the other battery packs so that the electrical characteristics of the other battery packs are equal to the electrical characteristics of the battery pack whose electrical characteristics have been determined to be the worst; and electrically connecting in parallel the other battery packs whose confining pressure has been reduced and the battery pack whose electrical characteristics have been determined to be the worst.

2. The manufacturing method of an all-solid battery according to claim 1, further comprising:

measuring the electrical characteristics of a plurality of single batteries, respectively;

classifying the plurality of single batteries into a plurality of groups according to the magnitudes of the measured electrical characteristics; and forming a battery pack for each classified group.

3. The manufacturing method of an all-solid battery according to claim 2, wherein the reducing the confining pressures of the other battery packs includes selecting a confining jig in accordance with the reduced confining pressure.

4. The manufacturing method of an all-solid battery according to claim 3, further comprising:

aging a plurality of battery packs whose confining pressure has been reduced;

measuring the electrical characteristics of the plurality of aged battery packs, respectively; and readjusting the confining pressures that confine the plurality of battery packs so that the electrical characteristics of the plurality of battery packs are equal, wherein the readjusting the confining pressures that confine the plurality of battery packs includes exchanging the confining jig with another in accordance with the readjusted confining pressure.

5. The manufacturing method of an all-solid battery according to claim 1, wherein the reducing the confining pressures of the other battery packs includes selecting a confining jig in accordance with the reduced confining pressure.

6. The manufacturing method of an all-solid battery according to claim 5, further comprising:

aging a plurality of battery packs whose confining pressure has been reduced;

measuring the electrical characteristics of the plurality of aged battery packs, respectively; and readjusting the confining pressures that confine the plurality of battery packs so that the electrical characteristics of the plurality of battery packs are equal, wherein the readjusting the confining pressures that confine the plurality of battery packs includes exchanging the confining jig with another in accordance with the readjusted confining pressure.

7. The manufacturing method of an all-solid battery according to claim 1, wherein the confining the plurality of battery packs by the equal confining pressure includes confining the plurality of battery packs by a maximum confining pressure of the confining jig that confines the plurality of battery packs.

8. The manufacturing method of an all-solid battery according to claim 1, wherein the electrical characteristics that are measured are output.

* * * * *